(12) United States Patent
Nelson et al.

(10) Patent No.: US 8,328,471 B2
(45) Date of Patent: Dec. 11, 2012

(54) CUTTING INSERT WITH INTERNAL COOLANT DELIVERY AND CUTTING ASSEMBLY USING THE SAME

(75) Inventors: Joseph Nelson, Greensburg, PA (US); Linn Andras, Latrobe, PA (US); Thomas Muller, Greensburg, PA (US); Paul Prichard, Greensburg, PA (US); Brad Hoffer, White, PA (US)

(73) Assignee: Kennametal Inc., Latrobe, PA (US)

( * ) Notice: Subject to any disclaimer, the term of this patent is extended or adjusted under 35 U.S.C. 154(b) by 378 days.

(21) Appl. No.: 12/797,249

(22) Filed: Jun. 9, 2010

(65) Prior Publication Data
US 2011/0027021 A1 Feb. 3, 2011

Related U.S. Application Data

(63) Continuation-in-part of application No. 11/940,394, filed on Nov. 15, 2007, which is a continuation-in-part of application No. 11/654,833, filed on Jan. 18, 2007, now Pat. No. 7,963,729.

(51) Int. Cl.
*B23C 5/28* (2006.01)
*B23B 27/10* (2006.01)

(52) U.S. Cl. .............................. 407/11; 407/2; 407/113

(58) Field of Classification Search .................. 407/2, 6, 407/11, 113; *B23B 27/10; B23C 5/28*
See application file for complete search history.

(56) References Cited

U.S. PATENT DOCUMENTS

| 2,870,523 A | 1/1959 | Richard |
| 3,077,802 A | 2/1963 | Philip |
| 3,323,195 A | 6/1967 | Vanderjagt |
| 3,429,700 A | 2/1969 | Wiegand et al. |
| 3,486,378 A | 12/1969 | Carlson |
| 3,561,299 A | 2/1971 | Brisk et al. |
| 3,571,877 A | 3/1971 | Zerkle |
| 3,798,726 A | 3/1974 | Dudley |
| 3,889,520 A | 6/1975 | Stoferle et al. |

(Continued)

FOREIGN PATENT DOCUMENTS
DE 3004166 C2 2/1980
(Continued)

OTHER PUBLICATIONS

A.S.T.M. Tool Engineers Handbook McGraw Hill Book Co. New York, NY (1949) pp. 302-315.

(Continued)

*Primary Examiner* — Andrea Wellington
*Assistant Examiner* — Sara Addisu
(74) *Attorney, Agent, or Firm* — Larry R. Meenan, Esq.

(57) ABSTRACT

A metalcutting insert that is useful in chipforming and material removal from a workpiece The metalcutting insert includes a metalcutting insert body, which includes a cutting edge having at least one discrete cutting location. The metalcutting insert body further contains a distinct interior coolant passage communicating with the discrete cutting location. The distinct interior coolant passage has a coolant passage inlet defining a coolant passage inlet cross-sectional area, a coolant passage discharge defining a coolant passage discharge cross-sectional area, and an axial coolant passage length. The distinct interior coolant passage defines a coolant flow cross-sectional area along the axial coolant passage length thereof. The coolant passage inlet cross-sectional area is substantially the same as the coolant passage discharge cross-sectional area. The geometry of the coolant flow area changes along the axial coolant passage length.

13 Claims, 18 Drawing Sheets

U.S. PATENT DOCUMENTS

| | | |
|---|---|---|
| 3,971,114 A | 7/1976 | Dudley |
| 4,012,061 A | 3/1977 | Olson |
| 4,123,194 A | 10/1978 | Cave |
| 4,204,787 A | 5/1980 | McCray et al. |
| 4,252,102 A | 2/1981 | Phaal et al. |
| 4,276,085 A | 6/1981 | Wisell |
| 4,437,800 A | 3/1984 | Araki et al. |
| 4,508,183 A | 4/1985 | Drummond et al. |
| 4,535,216 A | 8/1985 | Cassidenti |
| 4,579,488 A | 4/1986 | Griffin |
| 4,682,916 A | 7/1987 | Briese |
| 4,813,831 A | 3/1989 | Reinauer |
| 4,848,198 A | 7/1989 | Royal et al. |
| 4,861,203 A | 8/1989 | Bassett et al. |
| 4,880,461 A | 11/1989 | Uchida |
| 4,880,755 A | 11/1989 | Mehrotra |
| 4,881,431 A | 11/1989 | Bieneck |
| 4,955,264 A | 9/1990 | Armbrust |
| 5,024,976 A | 6/1991 | Mehrotra et al. |
| 5,148,728 A | 9/1992 | Mazurkiewicz |
| 5,163,790 A | 11/1992 | Vig |
| RE34,180 E | 2/1993 | Nemeth et al. |
| 5,222,843 A | 6/1993 | Katbi et al. |
| 5,237,894 A | 8/1993 | Lindeke |
| 5,252,119 A | 10/1993 | Nishida et al. |
| 5,265,985 A | 11/1993 | Boppana et al. |
| 5,275,633 A | 1/1994 | Johansson et al. |
| 5,288,186 A | 2/1994 | Kovacevic |
| 5,290,135 A | 3/1994 | Ball et al. |
| 5,316,323 A | 5/1994 | Jovanovic |
| 5,333,520 A | 8/1994 | Fischer et al. |
| 5,346,335 A | 9/1994 | Harpaz et al. |
| 5,388,487 A | 2/1995 | Danielsen |
| 5,439,327 A | 8/1995 | Wertheim |
| 5,516,242 A | 5/1996 | Andronica |
| 5,525,134 A | 6/1996 | Mehrotra et al. |
| 5,542,792 A | 8/1996 | Krueger et al. |
| 5,554,338 A | 9/1996 | Sugihara et al. |
| 5,565,156 A | 10/1996 | Ingelstrom |
| 5,707,185 A | 1/1998 | Mizutani |
| 5,718,156 A | 2/1998 | Lagrolet et al. |
| 5,733,075 A | 3/1998 | Basteck |
| 5,761,974 A | 6/1998 | Wang et al. |
| 5,775,854 A | 7/1998 | Wertheim |
| 5,816,753 A | 10/1998 | Hall |
| 5,826,469 A | 10/1998 | Haradem |
| 5,829,331 A | 11/1998 | Mori |
| 5,901,623 A | 5/1999 | Hong |
| 5,955,186 A | 9/1999 | Grab |
| 5,975,817 A | 11/1999 | Komine |
| 6,010,283 A | 1/2000 | Henrich et al. |
| 6,045,300 A | 4/2000 | Antoun |
| 6,050,756 A | 4/2000 | Buchholz et al. |
| 6,053,669 A | 4/2000 | Lageberg |
| 6,056,486 A | 5/2000 | Colvin |
| 6,117,533 A | 9/2000 | Inspektor |
| 6,124,040 A | 9/2000 | Kolaska et al. |
| 6,164,169 A | 12/2000 | Goff |
| 6,287,058 B1 | 9/2001 | Arai et al. |
| 6,287,682 B1 | 9/2001 | Grab et al. |
| 6,299,388 B1 | 10/2001 | Slabe |
| 6,312,199 B1 | 11/2001 | Sjoden et al. |
| 6,322,746 B1 | 11/2001 | LaSalle et al. |
| 6,350,510 B1 | 2/2002 | Konig et al. |
| 6,394,709 B1 | 5/2002 | Sjoo et al. |
| 6,443,672 B1 | 9/2002 | Lagerberg |
| 6,447,218 B1 | 9/2002 | Lagerberg |
| 6,447,890 B1 | 9/2002 | Leverenz et al. |
| 6,450,738 B1 | 9/2002 | Ripley |
| 6,471,448 B1 | 10/2002 | Lagerberg |
| 6,521,349 B1 | 2/2003 | Konig et al. |
| 6,528,171 B1 | 3/2003 | Endler et al. |
| 6,551,551 B1 | 4/2003 | Gegel et al. |
| 6,575,672 B1 | 6/2003 | Maier |
| 6,595,727 B2 | 7/2003 | Arvidsson |
| 6,634,835 B1 | 10/2003 | Smith |
| 6,637,984 B2 | 10/2003 | Murakawa et al. |
| 6,648,565 B2 | 11/2003 | Schweizer |
| 6,652,200 B2 | 11/2003 | Kraemer |
| 6,705,805 B2 | 3/2004 | Lagerberg |
| 6,708,590 B2 | 3/2004 | Lagerberg |
| 6,712,564 B1 | 3/2004 | Hughes et al. |
| 6,769,335 B2 | 8/2004 | Kaminski |
| 6,860,172 B2 | 3/2005 | Hecht |
| 6,884,499 B2 | 4/2005 | Penich et al. |
| 6,905,992 B2 | 6/2005 | Mehrotra et al. |
| 6,913,428 B2 | 7/2005 | Kress et al. |
| 6,957,933 B2 | 10/2005 | Pachao-Morbitzer et al. |
| 6,998,173 B2 | 2/2006 | Liu et al. |
| 7,094,717 B2 | 8/2006 | Yeckley |
| 7,125,205 B2 | 10/2006 | Sheffler |
| 7,125,207 B2 | 10/2006 | Craig et al. |
| 7,160,062 B2 | 1/2007 | Tran |
| 7,252,024 B2 | 8/2007 | Zurecki et al. |
| 7,273,331 B2 | 9/2007 | Giannetti |
| 7,309,466 B2 | 12/2007 | Heinrich et al. |
| 7,396,191 B2 | 7/2008 | Fujimoto et al. |
| 7,407,348 B2 | 8/2008 | Sjogren et al. |
| 7,510,352 B2 * | 3/2009 | Craig et al. ............... 407/107 |
| 7,530,769 B2 | 5/2009 | Kress et al. |
| 7,621,700 B2 | 11/2009 | Jonsson et al. |
| 7,634,957 B2 | 12/2009 | Ghosh et al. |
| 7,641,422 B2 | 1/2010 | Berminge et al. |
| 7,687,156 B2 | 3/2010 | Fang et al. |
| 7,955,032 B2 * | 6/2011 | Nelson ..................... 407/113 |
| 7,997,832 B2 * | 8/2011 | Prichard et al. ............ 407/11 |
| 8,079,783 B2 * | 12/2011 | Prichard et al. ............ 407/11 |
| 8,137,034 B2 * | 3/2012 | Noureddine ............... 407/11 |
| 8,202,025 B2 * | 6/2012 | Prichard et al. ............ 407/11 |
| 8,215,878 B2 * | 7/2012 | Rozzi et al. ............... 407/11 |
| 2001/0007215 A1 | 7/2001 | Murata et al. |
| 2002/0106250 A1 | 8/2002 | Murakawa et al. |
| 2003/0017014 A1 | 1/2003 | Morgulis et al. |
| 2003/0082018 A1 | 5/2003 | Kraemer |
| 2003/0095841 A1 | 5/2003 | Kraemer |
| 2004/0240949 A1 | 12/2004 | Pachao-Morbitzer et al. |
| 2005/0186039 A1 | 8/2005 | Muller et al. |
| 2006/0140728 A1 | 6/2006 | Giannetti |
| 2006/0171837 A1 | 8/2006 | Heinrich et al. |
| 2006/0263153 A1 | 11/2006 | Isaksson |
| 2008/0175676 A1 | 7/2008 | Prichard |
| 2008/0175677 A1 | 7/2008 | Prichard et al. |
| 2008/0175678 A1 | 7/2008 | Prichard |
| 2008/0175679 A1 | 7/2008 | Prichard |

FOREIGN PATENT DOCUMENTS

| | | |
|---|---|---|
| DE | 3429842 A1 | 2/1986 |
| DE | 3740814 A1 | 12/1987 |
| EP | 100376 A2 | 2/1984 |
| EP | 0599393 B1 | 2/1996 |
| EP | 842722 A1 | 5/1998 |
| EP | 0932460 B1 | 6/2003 |
| FR | 1279749 | 1/1961 |
| FR | 2244590 | 9/1973 |
| JP | 5669007 A2 | 6/1981 |
| JP | 57048405 A | 3/1982 |
| JP | 60127904 A | 7/1985 |
| JP | 04183503 A2 | 6/1992 |
| JP | 05301104 | 11/1993 |
| JP | 06083205 U | 11/1994 |
| JP | 07227702 A2 | 8/1995 |
| JP | 07237006 | 9/1995 |
| JP | 08025111 A | 1/1996 |
| JP | 08039387 | 2/1996 |
| JP | 08039387 A | 2/1996 |
| JP | 09262706 A | 10/1997 |
| JP | 10094904 A2 | 4/1998 |
| JP | 2000280106 A | 10/2000 |
| JP | 2001113408 A | 4/2001 |
| JP | 2001239420 A | 9/2001 |
| JP | 2003053622 A | 2/2003 |
| JP | 2003266207 A2 | 9/2003 |
| JP | 2003266208 A2 | 9/2003 |
| JP | 2004122262 A | 4/2004 |
| JP | 2005279900 A2 | 10/2005 |
| JP | 06136953 A | 6/2006 |
| KR | 1020060027154 A | 3/2006 |

| | | | |
|---|---|---|---|
| KR | 1020060054916 A | 5/2006 |
| RU | 2038925 C1 | 7/1995 |
| WO | 0076697 A2 | 12/2000 |
| WO | 0158632 A1 | 8/2001 |

OTHER PUBLICATIONS

Moltrecht, K.H. Machine Shop Practice, Industrial Press Inc. New York, NY (1981) pp. 199-204.

Santhanam et al. "Cemented Carbides", Metals Handbook, vol. 2, 10th Edition, Properties and Selection, ASM International (1990) pp. 950-977.

Wertheim et al., "Influence of High-Pressure Flushing through the Rake Face of a Cutting Tool", Annuals of the CIRP, vol. 41/1 (1992) pp. 101-106.

* cited by examiner

US 8,328,471 B2

CUTTING INSERT WITH INTERNAL COOLANT DELIVERY AND CUTTING ASSEMBLY USING THE SAME

This patent application is a continuation-in-part of pending U.S. patent application Ser. No. 11/940,394 filed on Nov. 15, 2007 for MILLING CUTTER AND MILLING INSERT WITH CORE AND COOLANT DELIVERY by Paul D. Prichard and Linn R. Andras, which is a continuation-in-part of co-pending U.S. patent application Ser. No. 11/654,833 filed on Jan. 18, 2007 for MILLING CUTTER AND MILLING INSERT WITH COOLANT DELIVERY by Paul D. Prichard and Linn R. Andras. Applicants hereby claim the benefit of the priority of the above two above-mentioned pending United States Patent Application, i.e., U.S. patent application Ser. No. 11/940,394 filed on Nov. 15, 2007 and U.S. patent application Ser. No. 11/654,833 filed on Jan. 18, 2007. Applicants further hereby incorporate by reference herein the entirety of each of said two mentioned pending United States Patent Application, i.e., U.S. patent application Ser. No. 11/940,394 filed on Nov. 15, 2007 and U.S. patent application Ser. No. 11/654,833 filed on Jan. 18, 2007.

BACKGROUND OF THE INVENTION

The invention relates to a cutting insert, which has internal coolant delivery, and an assembly using the cutting insert for use in the chipforming removal of material from a workpiece. More specifically, the invention pertains to a cutting insert, as well as an assembly using the cutting insert, used for chipforming material removal operations wherein there is enhanced delivery of coolant adjacent the interface between the cutting insert and the workpiece (i.e., the insert-chip interface) to diminish excessive heat at the insert-chip interface.

In a chipforming material removal operation (e.g., a milling operation, a turning operation, and the like), heat is generated at the interface between the cutting insert and the location where the chip is removed from the workpiece (i.e., the insert-chip interface). It is well-known that excessive heat at the insert-chip interface can negatively impact upon (i.e., reduce or shorten) the useful tool life of the cutting insert. As can be appreciated, a shorter useful tool life increases operating costs and decreases overall production efficiency. Hence, there are readily apparent advantages connected with decreasing the heat at the insert-chip interface.

U.S. Pat. No. 6,053,669 to Lagerberg for CHIP FORMING CUTTING INSERT WITH INTERNAL COOLING discusses the importance of reducing the heat at the insert-chip interface. Lagerberg mentions that when the cutting insert is made from cemented carbide reaches a certain temperature, its resistance to plastic deformation decreases. A decrease in plastic deformation resistance increases the risk for breakage of the cutting insert. U.S. Pat. No. 5,775,854 to Wertheim for METAL CUTTING TOOL points out that a rise in the working temperature leads to a decrease in hardness of the cutting insert. The consequence is an increase in wear of the cutting insert.

Other patent documents disclose various ways to or systems to deliver coolant to the insert-chip interface. For example, U.S. Pat. No. 7,625,157 to Prichard et al. for MILLING CUTTER AND MILLING INSERT WITH COOLANT DELIVERY pertains to a cutting insert that includes a cutting body with a central coolant inlet. The cutting insert further includes a positionable diverter. The diverter has a coolant trough, which diverts coolant to a specific cutting location. U.S. Patent Application Publication No. US 2008-0175678 A1 to Prichard et al. for METAL CUTTING SYSTEM FOR EFFECTIVE COOLANT DELIVERY pertains to a cutting insert that functions in conjunction with a top piece and/or a shim to facilitate delivery of coolant to a cutting location.

U.S. Pat. No. 6,045,300 to Antoun for TOOL HOLDER WITH INTEGRAL COOLANT PASSAGE AND REPLACEABLE NOZZLE discloses using high pressure and high volume delivery of coolant to address heat at the insert-chip interface. U.S. Pat. No. 6,652,200 to Kraemer for a TOOL HOLDER WITH COOLANT SYSTEM discloses grooves between the cutting insert and a top plate. Coolant flows through the grooves to address the heat at the insert-chip interface. U.S. Pat. No. 5,901,623 to Hong for CRYOGENIC MACHINING discloses a coolant delivery system for applying liquid nitrogen to the insert-chip interface.

It is readily apparent that in a chipforming and material removal operation, higher operating temperatures at the insert-chip interface can have a detrimental impact on the useful tool life through premature breakage and/or excessive wear. It would be highly desirable to provide a cutting insert used for chipforming material removal operations wherein there is an improved delivery of coolant to the interface between the cutting insert and the workpiece (i.e., the insert-chip interface), which is the location on the workpiece where the chip is generated). There would be a number of advantages connected with the improved delivery of coolant to the insert-chip interface.

In a chipforming material removal operation, the chip generated from the workpiece can sometimes stick (e.g., through welding) to the surface of the cutting insert. The build up of chip material on the cutting insert in this fashion is an undesirable occurrence that can negatively impact upon the performance of the cutting insert, and hence, the overall material removal operation. It would be highly desirable to provide a cutting insert used for chipforming material removal operations wherein there is enhanced delivery of coolant to the insert-chip interface so as to result in enhanced lubrication at the insert-chip interface. The consequence of enhanced lubrication at the insert-chip interface is a decrease in the tendency of the chip to stick to the cutting insert.

In a chipforming material removal operation, there can occur instances in which the chips do not exit the region of the insert-chip interface when the chip sticks to the cutting insert. When a chip does not exit the region of the insert-chip interface, there is the potential that a chip can be re-cut. It is undesirable for the milling insert to re-cut a chip already removed from the workpiece. A flow of coolant to the insert-chip interface will facilitate the evacuation of chips from the insert-chip interface thereby minimizing the potential that a chip will be re-cut. It would be highly desirable to provide a cutting insert used for chipforming material removal operations wherein there is enhanced delivery of coolant to the insert-chip interface to reduce the potential that a chip will be re-cut. The consequence of enhanced flow of coolant to the insert-chip interface is better evacuation of chips from the vicinity of the interface with a consequent reduction in the potential to re-cut a chip.

A number of factors can impact the extent of the coolant delivered to the insert-chip interface. For example, the size of the structure that conveys the coolant to the cutting insert can be a limiting factor on the extent of coolant supplied to the cutting insert. Thus, it would be highly desirable to provide supply holes that are equal to or larger than the inlets in the cutting insert to maximize the flow of the coolant to the cutting insert. It would be highly desirable to provide a cutting insert in which two or more coolant channels convey coolant to a single discrete cutting location. Further, in order to customize the delivery of coolant, the use of irregular coolant channels and variable areas of the inlet and the discharge in the cutting insert which allow for such customization. One such feature is to provide for a range of diversion angles of the coolant, which can range between about 10 degrees and about 60 degrees In order to enhance delivery of coolant, it is advantageous to provide for the coolant to enter the cutting insert through the holder. This can include the use of an external coolant supply or an internal coolant supply In reference to the manufacturing of a cutting insert, there can be advantages in using multiple pieces, which together form the cutting insert. For example, in some instances a cutting insert formed from a base, which presents the cutting edge, and a core can result in enhanced longevity because only the base need to changed after reaching the end of the useful tool life. In such an arrangement, the core is detachably joins to the base whereby the core is re-used when the base wears out. The base and core can join together via co-sintering, brazing and/or gluing. As an alternative, the base and core can contact one another without joining together as an integral member, but remain separate components even though in close contact. In addition, to enhance performance, the base and the core can be from the same or dissimilar materials depending upon the specific application.

When the preferred embodiment of the cutting insert presents a round geometry, certain advantages can exist. For example, when the cutting insert has a round geometry, the assembly of multiple components, e.g., a base and a core, does not need indexing. A round cutting insert is not handed so it can be used in left, right and neutral. In profile turning, up to 50% of the round cutting insert can function as the cutting edge. A round cutting insert is also available to engage an anti-rotation feature.

SUMMARY OF THE INVENTION

In one form thereof, the invention is a metalcutting insert that is useful in chipforming and material removal from a workpiece. The metalcutting insert includes a metalcutting insert body, which includes a cutting edge having at least one discrete cutting location. The cutting insert body further contains a distinct interior coolant passage communicating with the discrete cutting location. The distinct interior coolant passage has a coolant passage inlet defining a coolant passage inlet cross-sectional area, a coolant passage discharge defining a coolant passage discharge cross-sectional area, and an axial coolant passage length. The distinct interior coolant passage defines a coolant flow cross-sectional area along the axial coolant passage length thereof. The coolant passage inlet cross-sectional area is substantially the same as the coolant passage discharge cross-sectional area. The geometry of the coolant flow cross-sectional area changes along the axial coolant passage length.

In another form thereof, the invention is a metalcutting assembly that is useful in chipforming and material removal from a workpiece wherein a coolant source supplies coolant to the metalcutting assembly. The metalcutting assembly comprises a holder that has a pocket wherein the pocket presents a flat surface containing a coolant port, which has a coolant port cross-sectional area, in communication with the coolant source. The pocket receives a metalcutting insert. The metalcutting insert includes a metalcutting insert body, which includes a cutting edge having at least one discrete cutting location. The metalcutting insert body further contains a distinct interior coolant passage communicating with the discrete cutting location. The distinct interior coolant passage has a coolant passage inlet defining a coolant passage inlet cross-sectional area, a coolant passage discharge defining a coolant passage discharge cross-sectional area, and an axial coolant passage length. The distinct interior coolant passage defines a coolant flow cross-sectional area along the axial coolant passage length thereof. The coolant passage inlet cross-sectional area is substantially the same as the coolant passage discharge cross-sectional area. The geometry coolant flow cross-sectional area changes along the axial coolant passage length.

BRIEF DESCRIPTION OF THE DRAWINGS

The following is a brief description of the drawings that form a part of this patent application.

DETAILED DESCRIPTION

Figure 1:
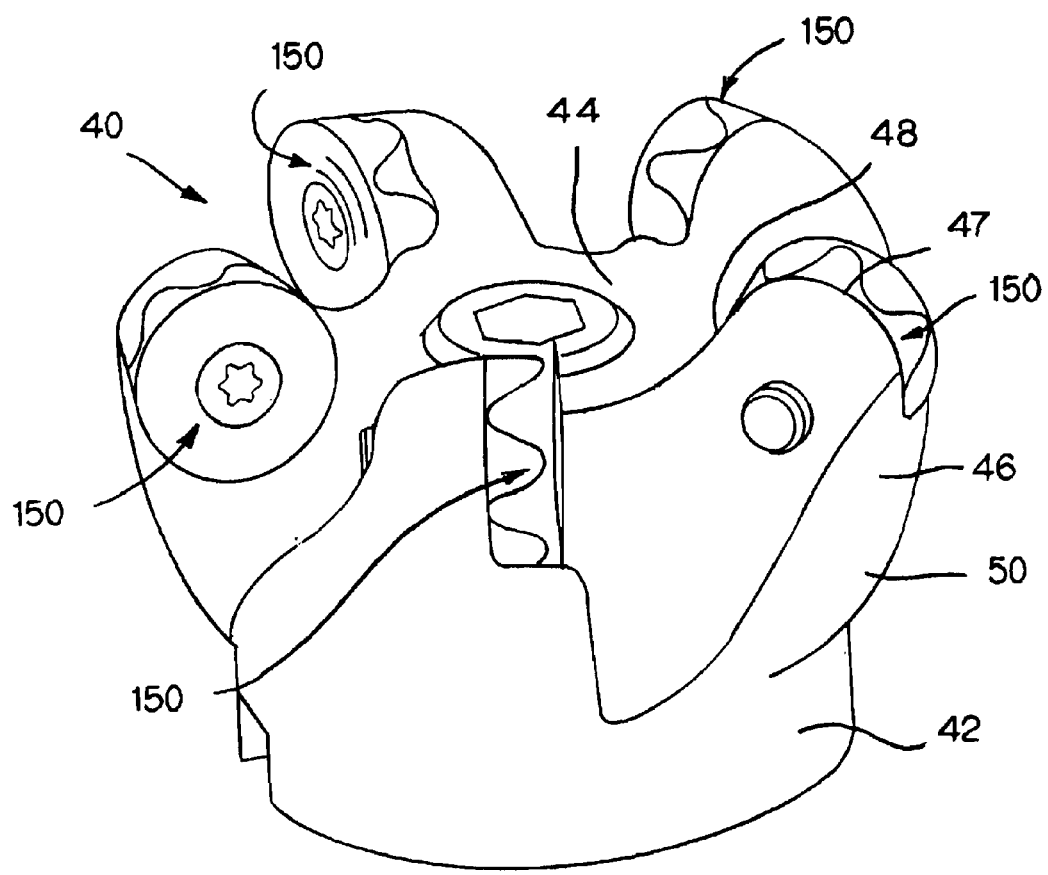
FIG. 1 is an isometric view of one specific embodiment of a milling cutter assembly wherein the milling cutter assembly has a milling cutter body that carries a plurality of cutting inserts, which in this specific embodiment is five cutting inserts wherein a pocket carries a single one of the cutting inserts.

Referring to the drawings, there should be an appreciation that the cutting insert of the invention, as well as the cutting assembly of the invention, can operate in a number of different applications. The cutting insert, which has internal coolant delivery, is for use in the chipforming removal of material from a workpiece. In this respect, the cutting insert is for use in a chipforming material removal operation wherein there is enhanced delivery of coolant adjacent the interface between the cutting insert and the workpiece (i.e., the insert-chip interface) to diminish excessive heat at the insert-chip interface.

The enhanced delivery of coolant to the insert-chip interface leads to certain advantages. For example, enhanced delivery of coolant to the insert-chip interface results in enhanced lubrication at the insert-chip interface which decreases the tendency of the chip to stick to the cutting insert. Further, enhanced flow of coolant to the insert-chip interface leads to better evacuation of chips from the vicinity of the interface with a consequent reduction in the potential to re-cut a chip.

As will be made apparent from the description hereinafter, the nature of the coolant dispersion or spray is such that it is continuous between the adjacent so-called activated interior coolant passages. The coolant actually exits the activated coolant passages in the form of a continuous cone of coolant, By providing such a coolant dispersion, the cutting insert achieves enhanced delivery of coolant to the insert-chip interface.

There should also be an appreciation that the interior coolant passage discharge has an orientation whereby the coolant impinges beneath the chip surface. Such an orientation of the coolant enhances the cooling properties, which enhances the overall performance of the cutting insert.

The description herein of specific applications should not be a limitation on the scope and extent of the use of the cutting insert.

In the chipforming material removal operation, the cutting insert 150 engages a workpiece to remove material from a workpiece typically in the form of chips. A material removal operation that removes material from the workpiece in the form of chips typically is known by those skilled in the art as a chipforming material removal operation. The book *Machine Shop Practice* [Industrial Press Inc., New York, N.Y. (1981)] by Moltrecht presents at pages 199-204 a description, inter alia, of chip formation, as well as different kinds of chips (i.e., continuous chip, discontinuous chip, segmental chip). Moltrecht reads [in part] at pages 199-200, "When the cutting tool first makes contact with the metal, it compresses the metal ahead of the cutting edge. As the tool advances, the metal ahead of the cutting edge is stressed to the point where it will shear internally, causing the grains of the metal to deform and to flow plastically along a plane called the shear plane . . . . When the type of metal being cut is ductile, such as steel, the chip will come off in a continuous ribbon . . . ". Moltrecht goes on to describe formation of a discontinuous chip and a segmented chip.

As another example, the text found at pages 302-315 of the *ASTE Tool Engineers Handbook*, McGraw Hill Book Co., New York, N.Y. (1949) provides a lengthy description of chip formation in the metal cutting process. At page 303, the ASTE Handbook makes the clear connection between chip formation and machining operations such as turning, milling and drilling. The following patent documents discuss the formation of chips in a material removal operation: U.S. Pat. No. 5,709,907 to Battaglia et al. (assigned to Kennametal Inc.), U.S. Pat. No. 5,722,803 to Battaglia et al. (assigned to Kennametal Inc.), and U.S. Pat. No. 6,161,990 to Oles et al. (assigned to Kennametal Inc.).

Referring to the drawings, FIG. 1 is an isometric view that shows a milling cutter assembly generally designated as 40. Milling cutter assembly 40 has a milling cutter body 42 with a central milling cutter body portion 44. A plurality of lobes 46 extend in a radial outward fashion from the central milling cutter body portion 44. Each one of the lobes 46 has a radial inner edge 46 and a radial outer edge 48. Each lobe 46 further has a distal end 47.

At the distal end 47, each one of the lobes 46 contains a pocket 54 that has a flat surface 56. The flat surface 56 is generally circular and has a circumferential edge 57. An upstanding wall 58 is at one end of the flat surface 56 wherein the upstanding wall 58 extends about a portion of the circumferential edge 57.

The flat surface 56 further contains an arcuate opening (arcuate notch) 60 that extends in a parallel manner for a portion of the circumferential edge 57. There is a coolant discharge port 62 in communication with the arcuate opening 60. The coolant discharge port 62 is in fluid communication with a coolant passage, which has a coolant entrance port. Coolant from a coolant source enters the coolant passage through the coolant entrance port and travels so to exit at the coolant discharge port into the arcuate opening 60. Coolant exiting into the arcuate opening 60 then passes into the cutting insert 150, as will be set forth in more detail hereinafter. The arcuate opening 60 extends about 90 degrees so to communicate with two adjacent interior coolant passages. The specific structure of the coolant source, the coolant passage, and the coolant entrance port is not illustrated, but is substantially the same as corresponding structure illustrated and discussed in conjunction with the screw-on toolholder 114.

Figure 1A:
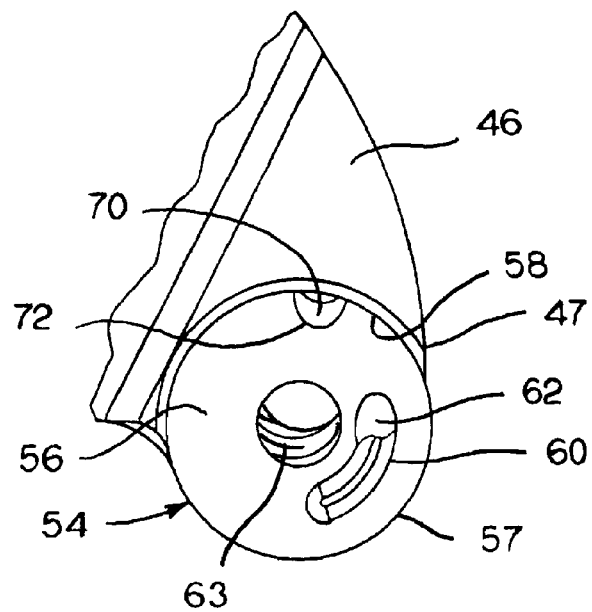
FIG. 1A is a front view of one of the pockets of the milling cutter assembly of FIG. 1 wherein the pocket does not have the cutting insert therein.

Referring to FIG. 1A, as mentioned hereinabove, the milling cutter body 42 has a pocket 54 and an adjacent upstanding wall 58. The upstanding wall 58 includes an anti-rotation abutment 70, which extends in a radial inward fashion from the upstanding wall 58. The anti-rotation abutment 70 further has a peripheral abutment edge 72. As will be described in more detail hereinafter, the peripheral abutment edge 72 exhibits a geometry to engage the cutting insert 150 whereby the anti-rotation abutment 70 prevents rotation of the cutting insert 150 when in the pocket 54. The anti-rotation abutment 70 and its cooperation with the cutting insert are along the lines of the structure shown and described in U.S. Pat. No. 6,238,133 B1 to DeRoche et al. for ANTI-ROTATION MOUNTING MECHANISM FOR ROUND CUTTING INSERT.

Figure 2:
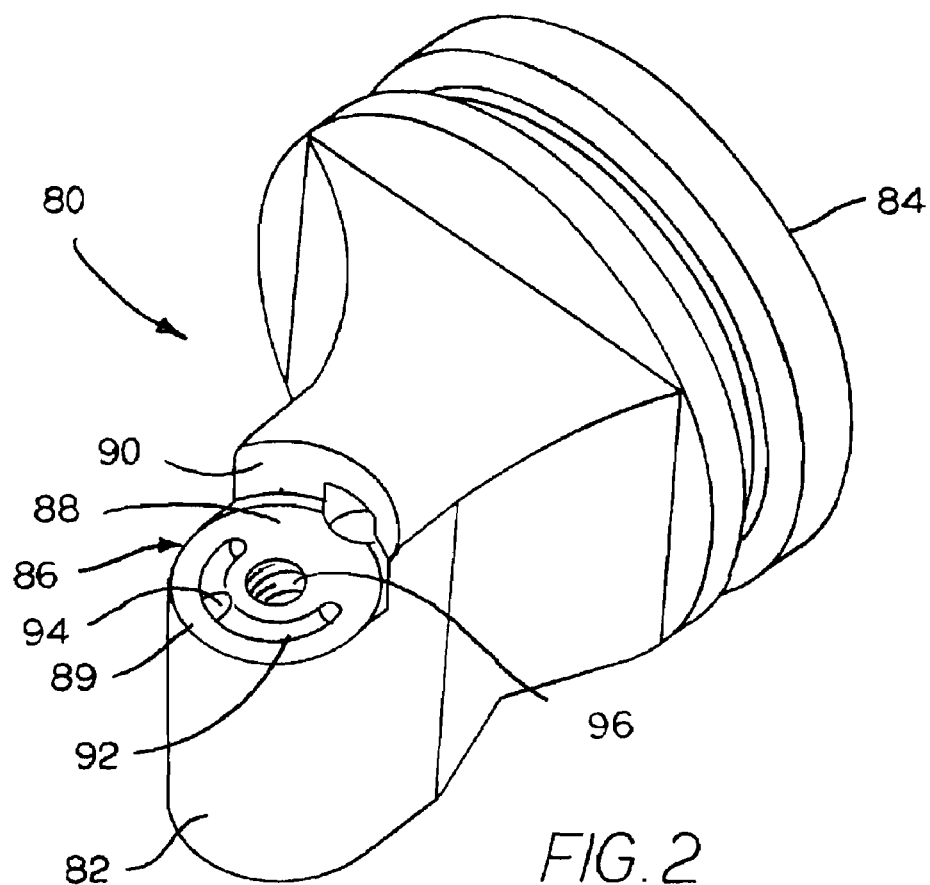
FIG. 2 is an isometric view of a specific embodiment of a KM® holder body that carries a cutting insert in a pocket and wherein the cutting insert is not in the pocket, and KM is a registered trademark of Kennametal Inc. of Latrobe, Pa. 15650.
Figure 2A:
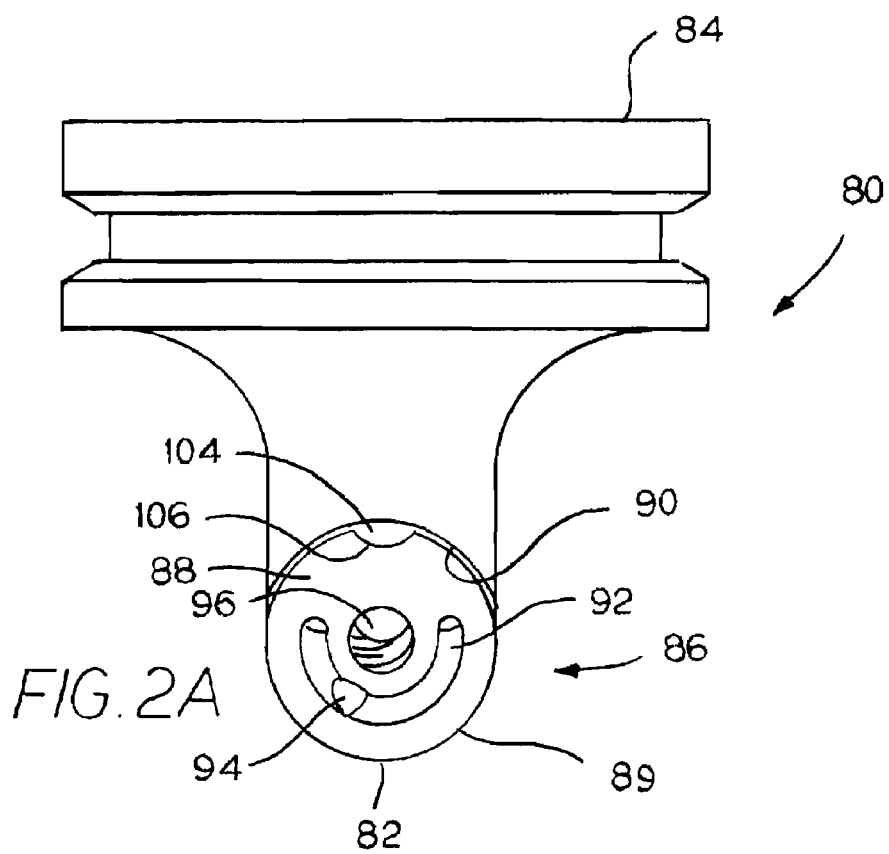
FIG. 2A is a top view of the pocket, which does not have the cutting insert therein, of the KM® holder body of FIG. 2.

The cutting insert 150 can be used in conjunction with holders other than the milling cutting 40 described above. For example and referring to FIGS. 2 and 2A, one can use the cutting insert 150 in conjunction with a KM® holder 80. The KM® holder 80 has a distal end 82 and a proximate end 84. The KM® holder 80 further has a pocket 86, which has a flat surface 88, at the distal end 82 thereof. The flat surface 88 has a circular geometry and a circumferential edge 89.

An upstanding wall 90 is adjacent to the flat surface 88. The upstanding wall 90 extends for a portion of the circumferential edge 89 of the flat surface 88. The flat surface 88 further contains an arcuate opening 92, which is in communication with a coolant discharge port 94. The flat surface 88 further has a threaded aperture 96, which facilitates attachment of the cutting insert 150 to the KM® holder 80, therein.

Although not shown in the drawings, the KM® holder 80 further has a coolant passage, which has a coolant entrance port. The coolant entrance port is in communication with a coolant source. As described in more detail hereinafter, the coolant passes from the coolant source through the coolant entrance port into the coolant passage and exits the coolant passage via the coolant discharge port 94 into the arcuate opening 92. Coolant then travels from the arcuate opening 92 into the cutting insert 150. The arcuate opening extends about 180 degrees so to communicate with three adjacent interior coolant passages.

The KM® holder 80 further includes an anti-rotation abutment 104 that extends in a radial inward fashion from the upstanding wall 90. The anti-rotation abutment 104 has a peripheral abutment surface 106. As will be the subject of a discussion hereinafter, the peripheral abutment surface 106 presents a geometry that engages the cutting insert 150 to prevent rotation of the cutting insert 150 when in the pocket 86.

Figure 3:
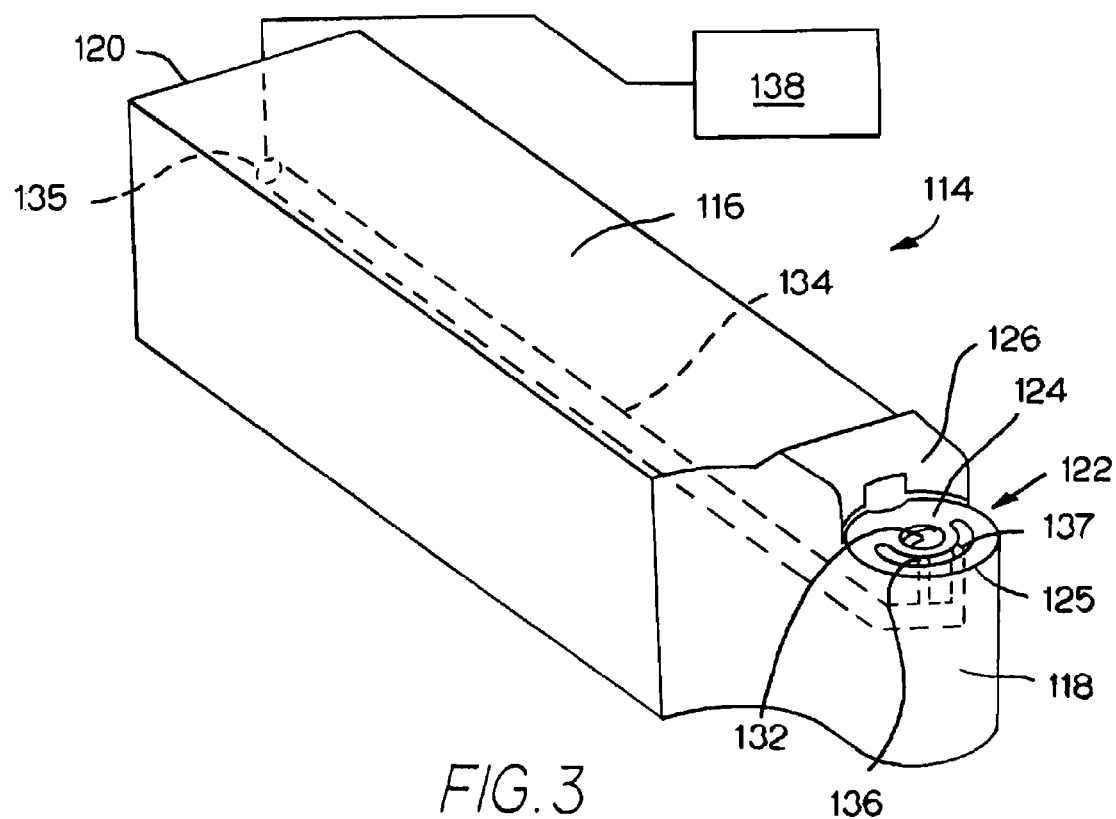
FIG. 3 is an isometric view of a specific embodiment of a screw-on toolholder body that carries a cutting insert in a pocket and wherein the cutting insert is not in the pocket, and wherein there is illustrated in schematic form the connection between the coolant source and the coolant discharge port in the flat surface of the pocket.
Figure 3A:
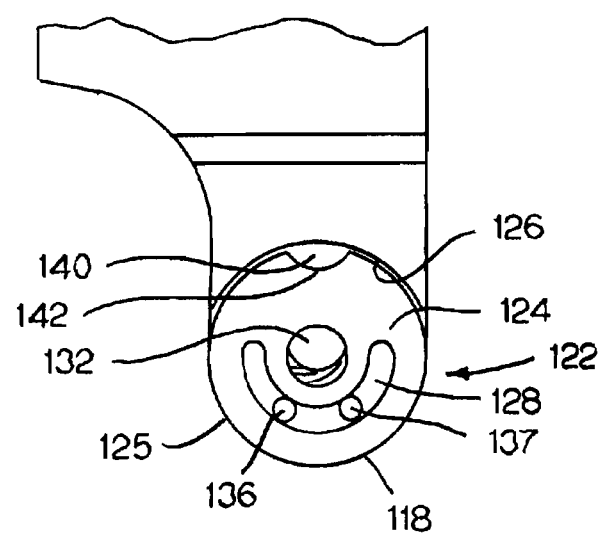
FIG. 3A is a top view of the pocket, which does not contain the cutting insert therein of the screw-on toolholder body of FIG. 3.

As still another example of a holder suitable for use with the cutting insert 150, FIGS. 3 and 3A illustrate a screw-on toolholder 114, which has a toolholder body 116. Toolholder body 116 has a distal end 118 and a proximate end 120. The toolholder body 116 has a pocket 122 at the distal end 118 thereof. The pocket 122 presents a flat surface 124 that presents a generally cylindrical shape with a peripheral circumferential edge 125. There is an upstanding wall 126 along a portion of the peripheral circumferential edge 125 of the flat surface 124.

The flat surface 124 further contains a threaded aperture 132, which facilitates attachment of the cutting insert 150 to the screw-on toolholder 114, therein.

The flat surface 124 contains an arcuate opening 128, which communicates with a coolant discharge port 130. The screw-on toolholder 114 further has a coolant passage 134, which has a coolant entrance port 135 and a pair of coolant discharge ports 136 and 137. The coolant discharge ports 136, 137 are in communication with a coolant source. As described in more detail hereinafter, the coolant passes from the coolant source 138 through the coolant entrance port 135 into the coolant passage 134 and exits the coolant discharge passage 134 via the coolant discharge ports 136, 137. Coolant then passes into the arcuate opening 128, and, as will be described in more detail, into the cutting insert 150. The arcuate opening extends about 180 degrees so to communicate with three adjacent interior coolant passages.

There should be an appreciation that any one of a number of different kinds of fluid or coolant are suitable for use in the cutting insert. Broadly speaking, there are two basic categories of fluids or coolants; namely, oil-based fluids which include straight oils and soluble oils, and chemical fluids which include synthetic and semisynthetic coolants. Straight oils are composed of a base mineral or petroleum oil and often contain polar lubricants such as fats, vegetable oils, and esters, as well as extreme pressure additives of chlorine, sulfur and phosphorus. Soluble oils (also called emulsion fluid) are composed of a base of petroleum or mineral oil combined with emulsifiers and blending agents Petroleum or mineral oil combined with emulsifiers and blending agents are basic components of soluble oils (also called emulsifiable oils). The concentration of listed components in their water mixture is usually between 30-85%. Usually the soaps, wetting agents, and couplers are used as emulsifiers, and their basic role is to reduce the surface tension. As a result they can cause a fluid tendency to foam. In addition, soluble oils can contain oiliness agents such as ester, extreme pressure additives, alkanolamines to provide Òreserve alkalinityÓ, a biocide such as triazine or oxazolidene, a defoamer such as a long chain organic fatty alcohol or salt, corrosion inhibitors, antioxidants, etc. Synthetic fluids (chemical fluids) can be further categorized into two subgroups: true solutions and surface active fluids. True solution fluids are composed essentially of alkaline inorganic and organic compounds and are formulated to impart corrosion protection to water. Chemical surface-active fluids are composed of alkaline inorganic and organic corrosion inhibitors combined with anionic non-ionic wetting agents to provide lubrication and improve wetting ability. Extreme-pressure lubricants based on chlorine, sulfur, and phosphorus, as well as some of the more recently developed polymer physical extreme-pressure agents can be additionally incorporated in this fluids. Semisynthetics fluids (also called semi-chemical) contains a lower amount of refined base oil (5-30%) in the concentrate. They are additionally mixed with emulsifiers, as well as 30-50% of water. Since they include both constituents of synthetic and soluble oils, characteristics properties common to both synthetics and water soluble oils are presented.

The toolholder body 116 further includes an anti-rotation abutment 140 that extends in a radial inward fashion from the upstanding wall 126. The anti-rotation abutment 140 has a peripheral abutment surface 142. The peripheral abutment surface 142 has a geometry that engages the cutting insert 150 to prevent rotation of the cutting insert 150 when in the pocket 122.

Referring to the remainder of the drawings, the following is a description of a preferred specific embodiment of the cutting insert 150 (see FIGS. 8 and 9) that is suitable for use with any one of the holders, i.e., milling cutter body 42, KM® holder 80, and screw-on toolholder 114. Cutting insert 150 is useful in chipforming material removal from a workpiece wherein a coolant source supplies coolant to the cutting insert. The cutting insert 150 includes a cutting insert body 151 (see FIG. 8) that comprises a base member 152 and a core member 154. As will be described in more detail hereinafter, the base member 152 and the core member 154 function together to form the cutting insert body 151. As will become apparent from the discussion hereinafter, the base member and core member can be joined together to form an integral piece or can be compressed together maintaining their individual separate and distinct nature.

The components, i.e., the base member 152 and the core member 154, of the cutting insert 150 may be made from one of any number of materials that are suitable for use as a cutting insert. The following materials are exemplary materials useful for a cutting insert: tool steels, cemented carbides, cermets or ceramics. The specific materials and combinations of materials depend upon the specific application for the cutting insert. Applicants contemplate that the base member and the core member may be made from different materials.

In reference to tool steels, the following patent documents disclose tool steels suitable for use as a cutting insert: U.S. Pat. No. 4,276,085 for High speed Steel, U.S. Pat. No. 4,880,461 for Superhard high-speed tool steel, and U.S. Pat. No. 5,252,119 for High Speed Tool Steel Produced by Sintered Powder and Method of Producing the Same. In reference to cemented carbides, the following patent documents disclose cemented carbides suitable for use as a cutting insert: U.S. Patent Application Publication No. US2006/0171837 A1 for a Cemented Carbide Body Containing Zirconium and Niobium and Method of Making the Same, U.S. Reissue Pat. No. 34,180 for Preferentially Binder Enriched Cemented Carbide Bodies and Method of Manufacture, and U.S. Pat. No. 5,955,186 for a Coated Cutting Insert with A C Porosity Substrate Having Non-Stratified Surface Binder Enrichment. In reference to cermets, the following patent documents disclose cermets suitable for use as a cutting insert: U.S. Pat. No. 6,124,040 for Composite and Process for the Production Thereof, and U.S. Pat. No. 6,010,283 for a Cutting Insert of a Cermet Having a Co—Ni—Fe Binder. In reference to ceramics, the following patent documents disclose ceramics suitable for use as a cutting insert: U.S. Pat. No. 5,024,976 for an Alumina-zirconia-silicon carbide-magnesia Ceramic Cutting Tools, U.S. Pat. No. 4,880,755 for a SiAlON Cutting Tool Composition, U.S. Pat. No. 5,525,134 for a silicon Nitride Ceramic and Cutting Tool made Thereof, U.S. Pat. No. 6,905,992 for a Ceramic Body Reinforced with Coarse Silicon Carbide Whiskers and Method for Making the Same, and U.S. Pat. No. 7,094,717 for a SiAlON Containing Ytterbium and Method of Making.

Figure 4:
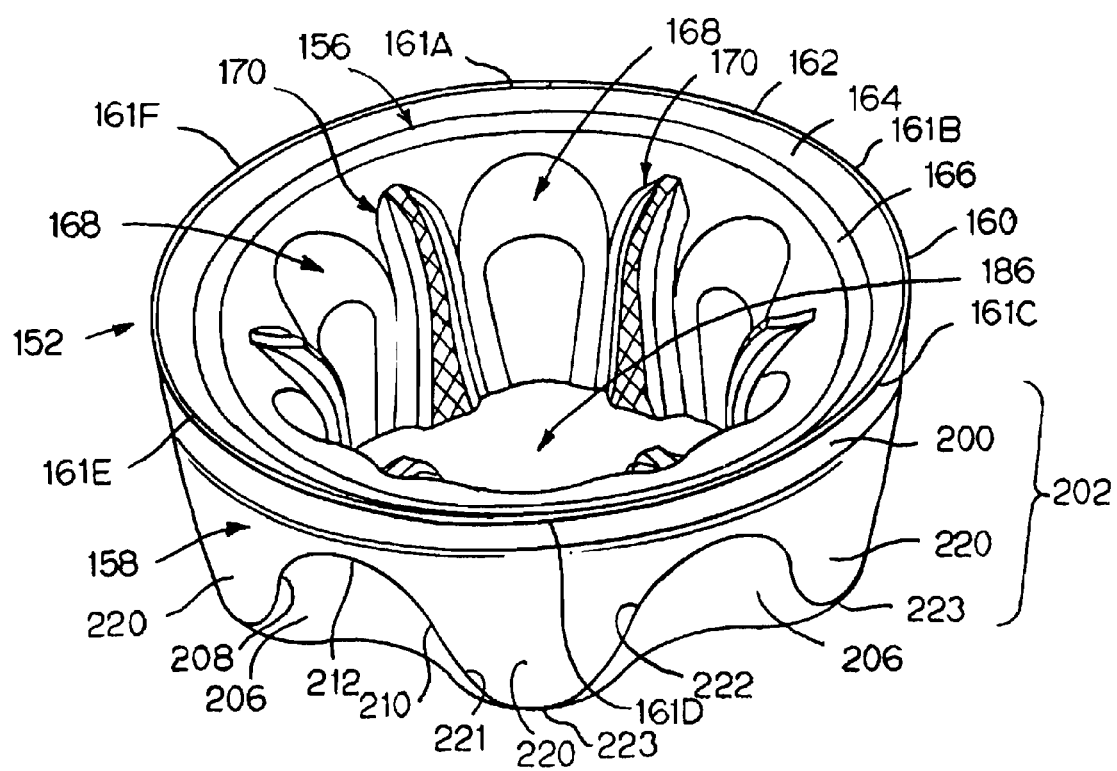
FIG. 4 is an isometric view of the base member of the cutting insert showing the rake surface and the flank surface of the base member.
Figure 4A:
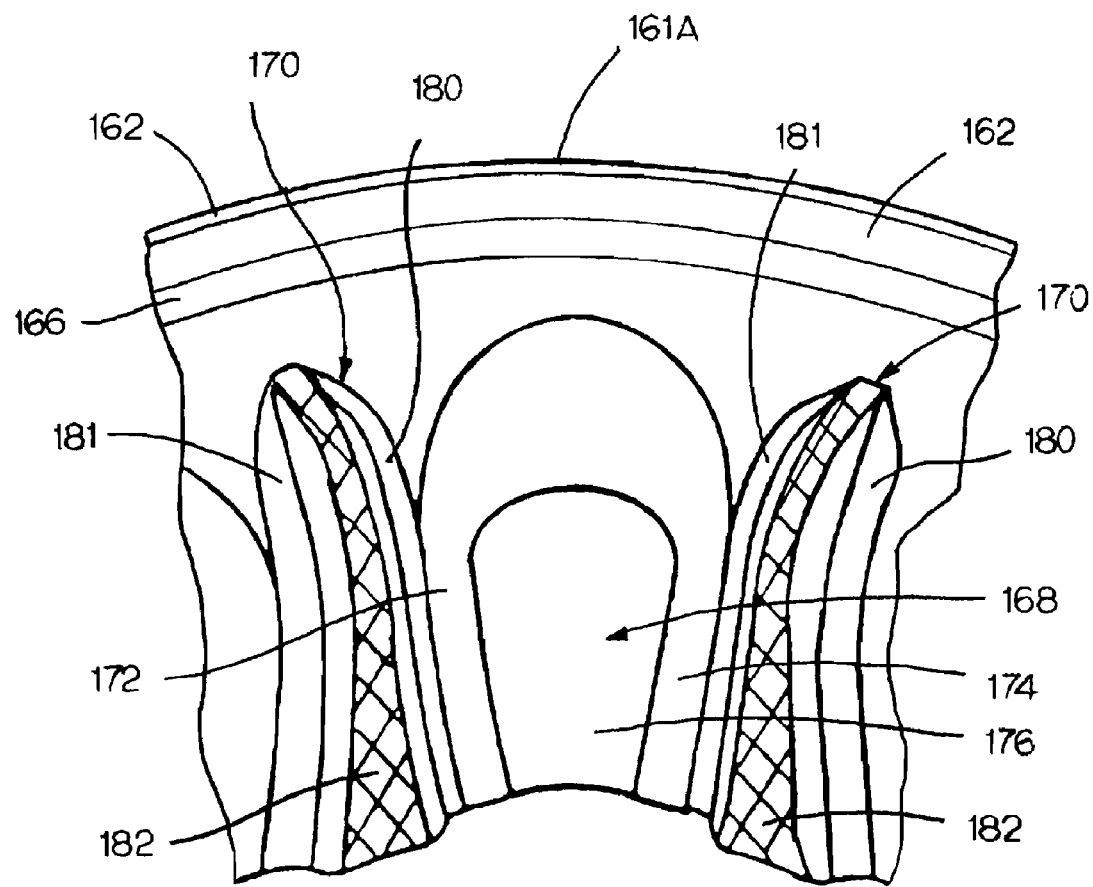
FIG. 4A is an enlarged view of a portion of the base member of FIG. 4 showing in detail the channel defined between two ribs.
Figure 5:
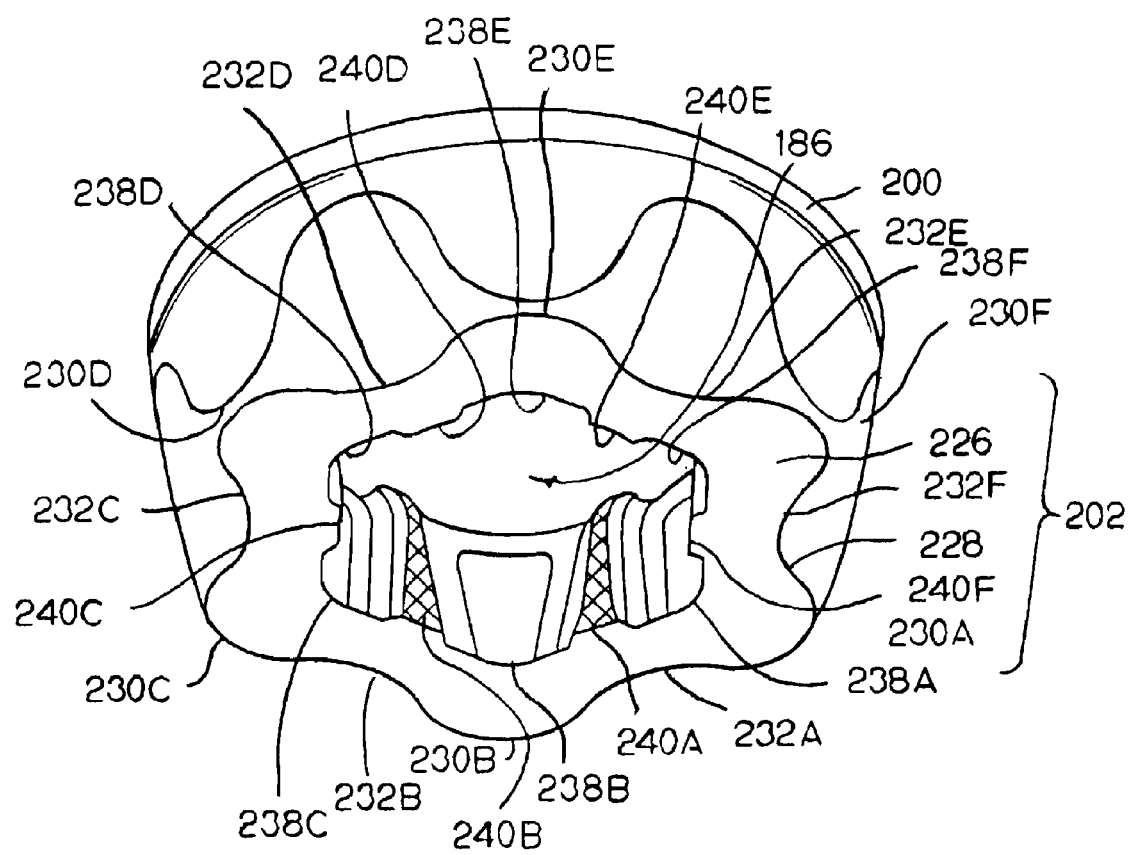
FIG. 5 is an isometric view of the base member of the cutting insert showing the bottom surface and the flank surface of the cutting insert.

Referring to the base member 152, as especially the illustrations of the base member 152 in FIGS. 4, 4A and 5, the base member 152 includes a rake surface 156 and a flank surface 158. Since the core member 154 fits within the base member 52 to form the cutting insert 150, the flank surface 158 of the base member 152 is the flank surface of the cutting insert 150. In a like fashion, due to the dimensioning and positioning of the core member 154 relative to the base member 152, the rake surface 156 of the base member 152 provides the operative rake surface of the cutting insert 150.

The intersection of the rake surface 156 and the flank surface 158 form a cutting edge 160, which in this embodiment is a generally round cutting edge. As will be described in more detail hereinafter, the cutting edge 160 presents a plurality of discrete cutting locations. In this embodiment, there are six discrete cutting locations 161A through 161F. The discrete cutting locations (161A-161F) are spaced apart about 60 degrees apart. Further, each discrete cutting location (161A-161F) is located mid-way between each pair of adjacent ribs 170.

The rake surface 156 of the base member 152 has a radial outward surface 162, which is radial inward of the cutting edge 160 and extends around the entire circumference of the rake surface 156. Located radial inward of the radial outward surface 162 is a first transition surface 164 and located radial inward of the first transition surface 164 is a second transition surface 166. Each one of the first and second transition surfaces moves toward the bottom of the cutting insert as it moves in a radial inward direction. The second transition surface 166 blends into either a channel 168 or a rib 170.

There should be an appreciation that the surfaces, i.e., radial outward surface 162, the first transition surface 164, and the second transition surface 166, may exhibit any one of a number of different geometries or surface configurations. An objective of these surfaces is to provide a transition between the cutting edge 160 and the interior portion of the base member 152 comprising the channels 168 and the ribs 170. Further, a particular specific geometry may be effective to enhance a chipbreaking feature of the cutting insert. A particular specific geometry may also be effective to enhance coolant delivery to the insert-chip interface as coolant can impinge on this area of the cutting insert.

Referring to FIG. 4A, which is an enlargement of a section of FIG. 4, each one of the channels 168 has a pair of opposite channel peripheral surfaces, i.e., channel peripheral surface 172 and a channel peripheral surface 174. Each channel 168 further has a central trough 176. Each adjacent rib 170 has a radial inward barrier 180 and an opposite radial inward barrier 181, which define lateral boundaries for the channel 168. Each one of the ribs 170 also has a peripheral contact surface 182.

The base member 152 further defines a central core reception aperture 186. The central core reception aperture 186 receives the core member 154. There is a discussion hereinafter of the assembly of the base member 152 and the core member 154.

The base member 152 also has a flank surface 158. The flank surface 158 has a cylindrical flank surface portion 200 adjacent to the rake surface 156. The cylindrical flank surface portion 200 extends toward the bottom surface a selected distance, at which point it transitions into a generally frusto-conically shaped surface portion (see bracket 202).

The generally frusto-conically shaped surface portion 202 presents a sinusoidal-shaped geometry wherein there are a plurality of sinusoidal-shaped valleys or scallops 206. Each one of the sinusoidal-shaped valleys 206 has an opposite side 208, another opposite side 210, and an arcuate mediate portion 212. For each sinusoidal-shaped valley 206, the circumferential width increases from the top to the bottom of the base member 152. Between each one of the sinusoidal-shaped valleys 206, there are sinusoidal-shaped islands 220. Each sinusoidal-shaped island 220 has opposite sides 221, 222 and an arcuate mediate portion 223. For each sinusoidal-shaped island 220, the circumferential width decreases from the top to the bottom of the base member 152.

Each sinusoidal-shaped valley 206 defines a depression that presents an arcuate surface. As will be discussed hereinafter, the sinusoidal-shaped valley 206 can cooperate with an anti-rotation abutment whereby the abutment engages the depression of the sinusoidal-shaped valley 206 to prevent rotation of the cutting insert 150 when in the pocket of the holder. There should be an appreciation that the geometry of the flank surface does not have to present the sinusoidal-shaped scallops. The flank surface can take on other geometries such as, for example, a smooth surface without scallops or depressions.

The base member 152 further has a bottom surface 226. The bottom surface 226 presents a sinusoidal-shaped circumferential edge 228. The sinusoidal-shaped circumferential edge 228 has a plurality of peaks 230A through 230F and a plurality of valleys 232A through 232F.

The bottom surface 226 of the base member 152 further contains notches 238A through 238F and lands 240A through 240F. These notches (238A-238F) and lands (240A-240F) define the profile of the edge at the termination of the central core reception aperture 186.

Figure 6:
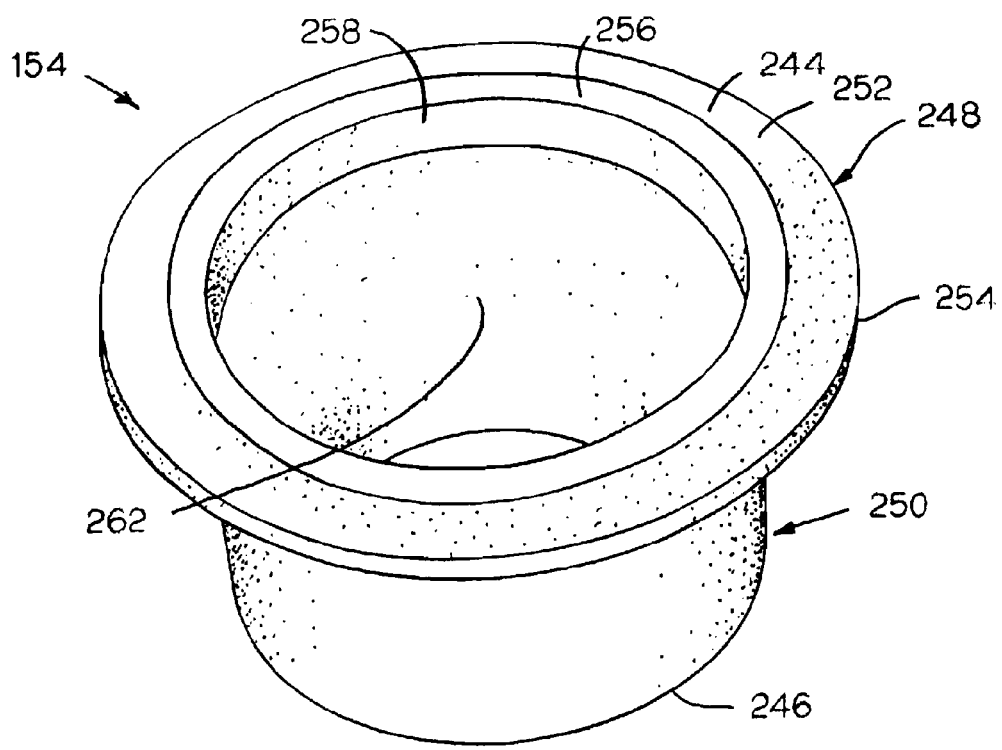
FIG. 6 is an isometric view of the core member of the cutting insert showing the top surface and the side surface of the core member.
Figure 7:
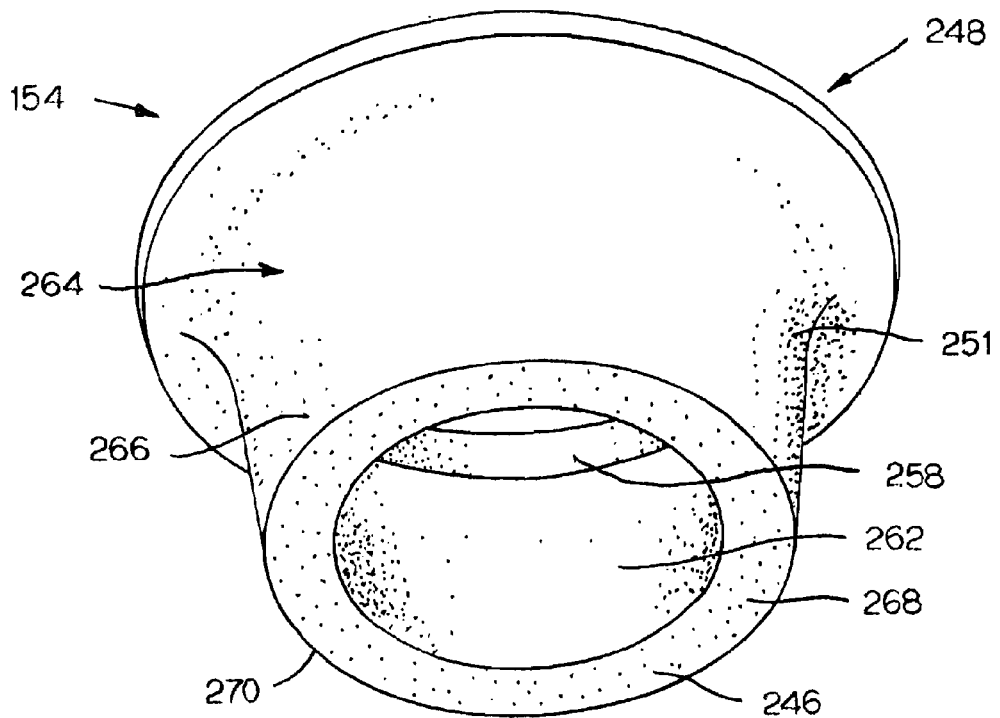
FIG. 7 is an isometric view of the core member of the cutting showing the bottom surface and the side surface of the core member.
Figure 7A:
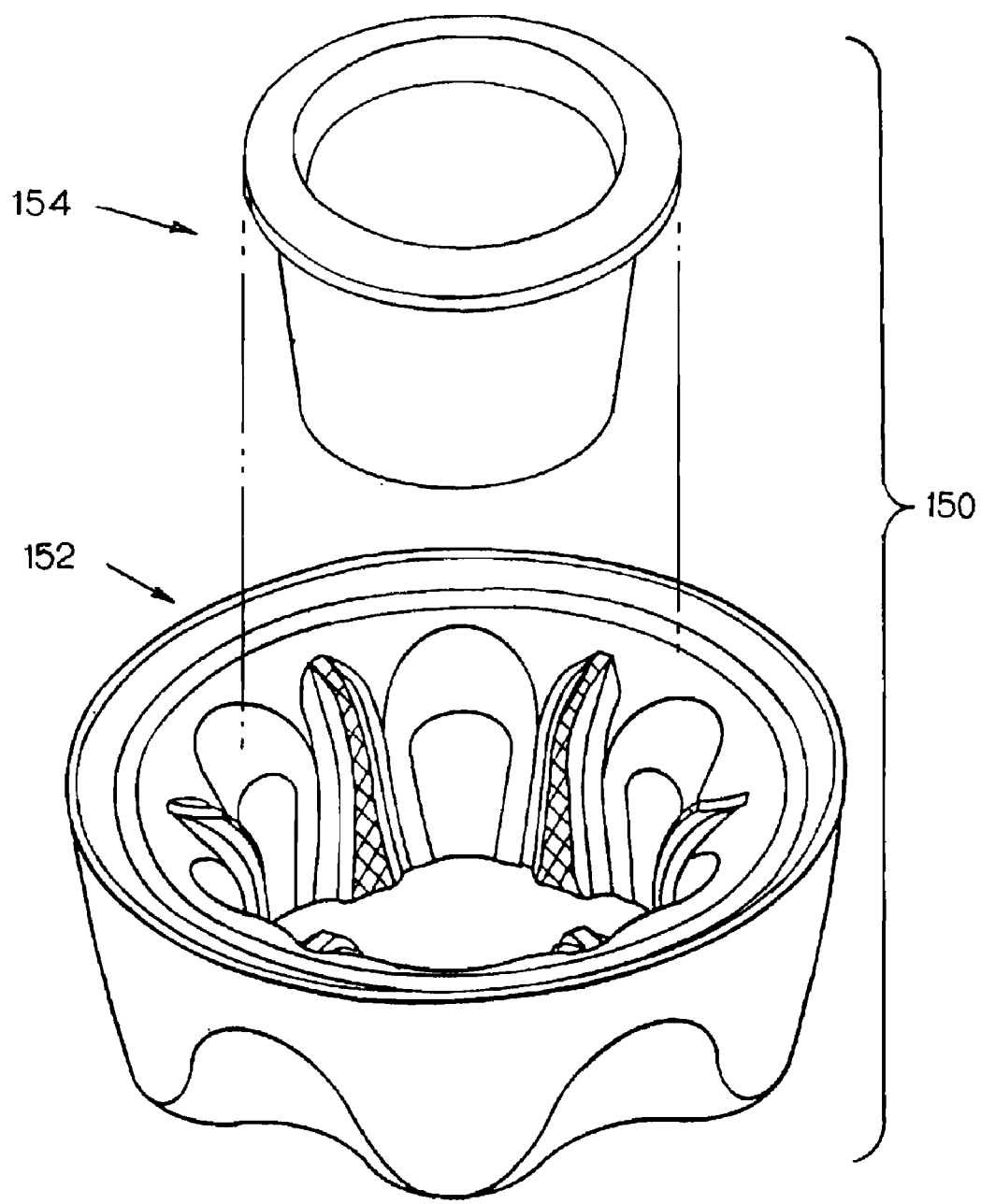
FIG. 7A is an isometric view of the base member and the core member wherein the core member is exploded away from the base member.

Referring to the structure of the core member 154, and especially FIGS. 6 and 7, the core member 154 comprises a top end 244 and a bottom end 246. Adjacent the top end 244 is a generally circular section 248, and adjacent the bottom end 246 is an integral generally frusto-conical section 250, which extends from the generally circular section 248 via an arcuate transition 251. At the top end 244 there is a radial outer top surface 252, which has a circumferential outer edge 254. Located radial inward of the radial outer top surface 252 is a radial inner edge 256.

Referring to the interior surface of the integral generally frusto-conical section 250, moving in a direction toward the bottom end 246, there is an interior transition surface 258 that blends into an interior cylindrical surface 262. Referring to the exterior surface of the integral generally frusto-conical section 250, there is an arcuate exterior surface 264 and a frusto-conical exterior surface 266. There is a bottom cylindrical surface 268, which has a radial outer circumferential edge 270, at the bottom end 246.

As will become apparent from the description below, the cutting insert body 151 contains a plurality of distinct interior coolant passages 300 (see FIG. 14) formed between the base member 152 and the core member 154. As described in more detail, When attached to the pocket of a holder, an adjacent pair of the distinct interior coolant passages 300 corresponds to each one of the discrete cutting locations.

Figure 8:
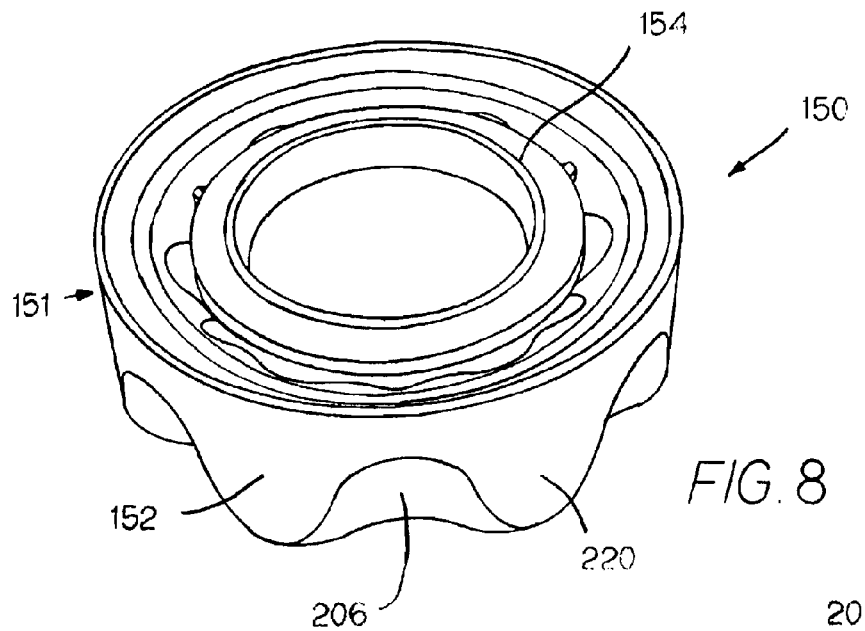
FIG. 8 is an isometric view of the assembly of the base member and the core member of the cutting insert showing the rake surface and flank surface of the cutting insert.
Figure 9:
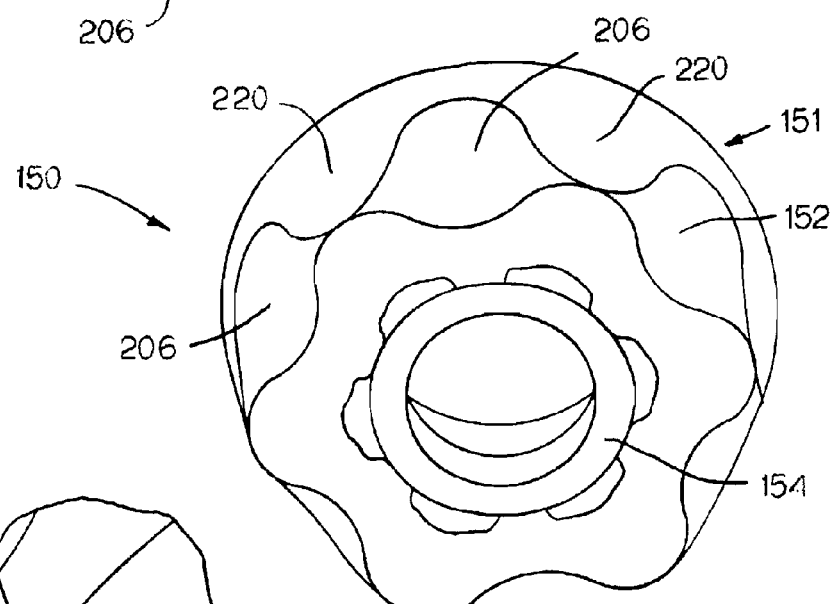
FIG. 9 is an isometric view of the bottom surface of the cutting insert.

In order to form the complete cutting insert 150, such as, for example illustrated in FIG. 8, the base member 152 and the core member 154 join together. FIG. 8A illustrates the core member 154 exploded away from and in alignment with the base member 152. The central core reception aperture 186 of the base member 152 receives the core member 154 so the exterior surface of the core member 154 contacts selected areas of the base member 152. More specifically, the portions of the arcuate exterior surface 264 and the frusto-conical exterior surface 266 contacts the arcuate contact surface 182 of each one of the ribs 168. In the drawings, the contact surface 182 is shown cross-hatched.

Figure 10:
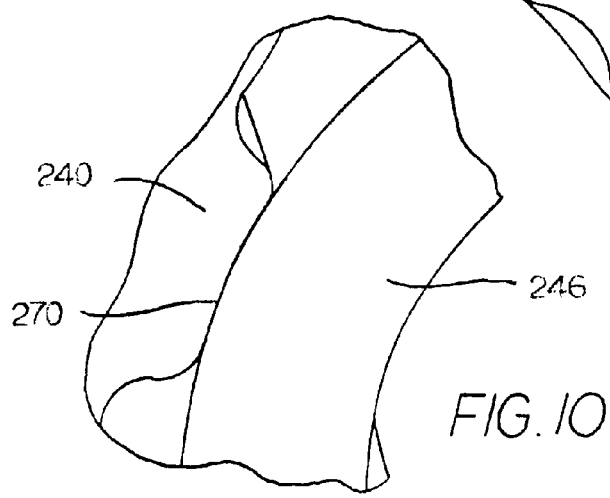
FIG. 10 is an enlarged view of the portion of the bottom surface showing a location of the joinder of the base member and the core member.
Figure 11:
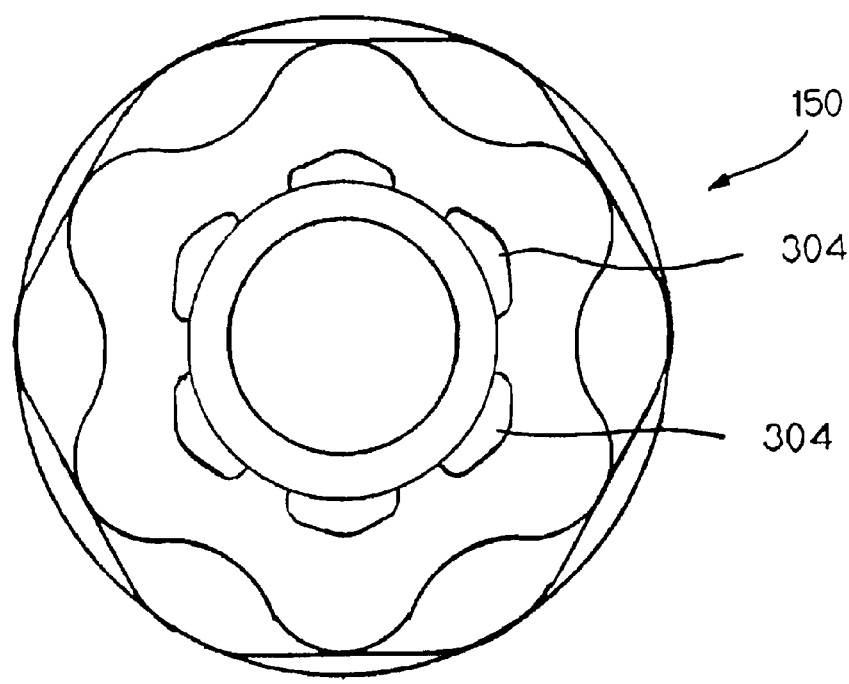
FIG. 11 is a bottom view of the specific embodiment of the cutting insert of FIG. 5.
Figure 12:
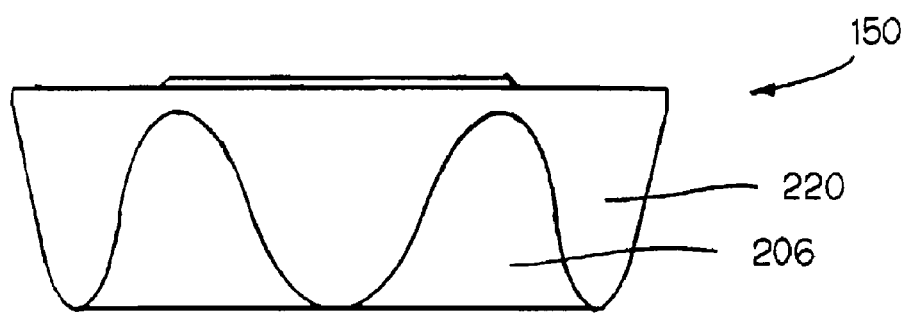
FIG. 12 is a side view of the specific embodiment of the cutting insert of FIG. 5.
Figure 15:
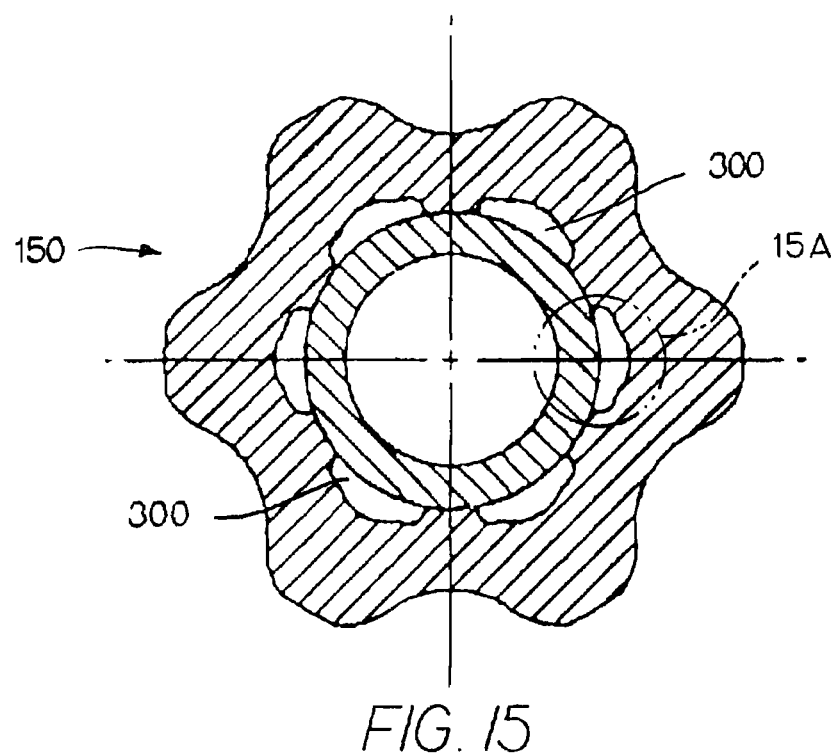
FIG. 15 is a cross-sectional view of the cutting insert showing the distinct interior coolant passageway taken along section line 15-15 of FIG. 14B.
Figure 16:
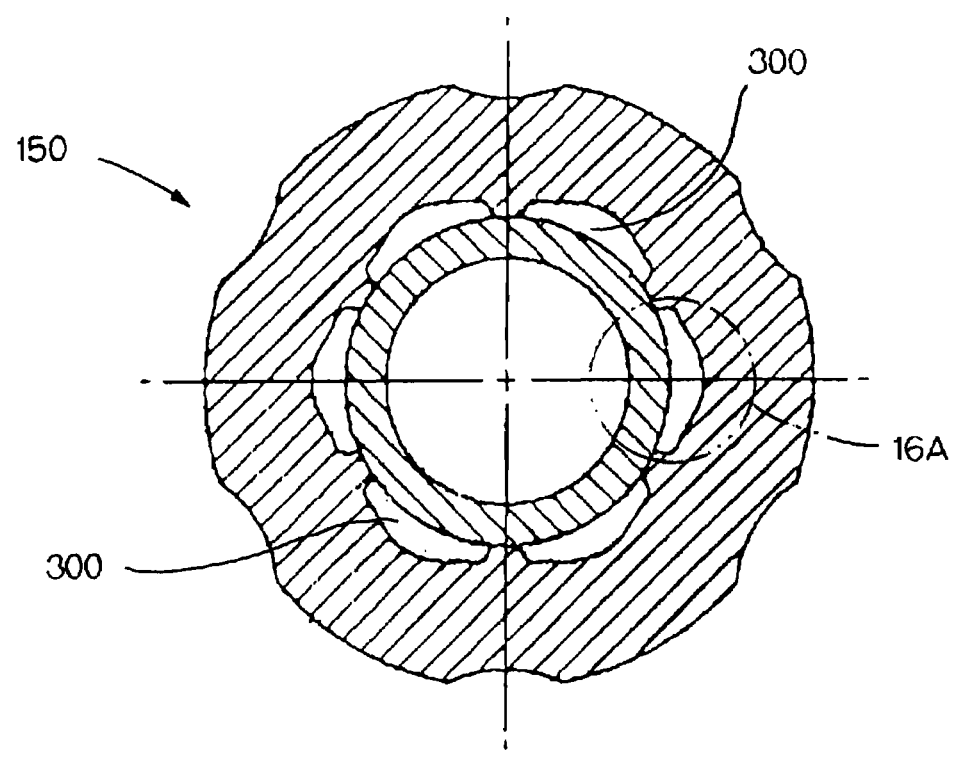
FIG. 16 is a cross-sectional view of the cutting insert showing the distinct interior coolant passageway taken along section line 16-16 of FIG. 14B.

The points of contact between the base member 152 and the core member 154 are very secure. This very secure contact between the base member 152 and the core member 154 is shows in FIG. 10 and in FIG. 15. The extent of the contact is sufficiently secure be fluid-tight at the locations of contact. The extent of the contact is secure enough so the components do not separate during usage.

The contact between the base member and the core member can be through actual joinder of these components together. One can accomplish the joinder of the base member 152 and the core member 154 via any one of a number of ways. For example, techniques such as, co-sintering, brazing and/or gluing are suitable. The specific technique may be particularly applicable to certain materials. For example, co-sintering may be applicable to a situation in which the base member and the core member are of the same material (e.g., tungsten carbide-cobalt material). Gluing may be applicable to a situation in which the materials for the base member and the core member are dissimilar (e.g., a steel core member and a tungsten carbide-cobalt base member). The contact can also be accomplished via compressing the component together while still maintaining theme to be separate and distinct from one another. For example, the cutting insert can be securely threaded to the holder whereby there is a very strong surface-to-surface contact between the base member and the core member due to the very tight connection between the cutting insert and the holder. When the components are compressed together via tightening of the cutting insert to the holder, these components may be separated upon detachment of the cutting insert from the holder.

The choice of specific materials for the components is dependent upon the particular applications for the cutting insert. The use of ceramic-ceramic or carbide-carbide or steel-carbide combinations of the components provides the cutting insert with a variety of material options. By doing so, the cutting insert has an expansive material selection feature that allows for optimum customization of the cutting insert from the materials perspective.

As is apparent, the components, and hence the cutting insert, present a round geometry. By using a round geometry, the assembly of multiple components, e.g., a base and a core, does not need indexing to accomplish. The absence of indexing or special alignment reduces the manufacturing costs and makes the assembly easier in contrast to components that require special alignment. This is especially the case for the core member. The core member has a generally cylindrical/conical geometry. It does not have exterior features that require special alignment or orientation in the assembly to the base. Thus, the assembly of the core to the base is easy and inexpensive as compared to the assembly of components, each of which have complex geometric features.

As mentioned above, the cutting insert 150 has a plurality of distinct interior coolant passage 300. The following description of one interior coolant passage 300 is sufficient for a description of all such interior coolant passages 300.

In reference to each one of the interior coolant passages 300, selected surfaces on the base member 152 and on the core member 154 define the boundaries of the interior coolant passage 300. More specifically, some of the selected surfaces of the base member 152 are those that define the channel 168, i.e., the channel peripheral surfaces 172, 174 and the central trough 176. Other selected surfaces of the base member 152 include the radial inward barrier 178 of one rib 170 and the radial inward barrier 180 of an adjacent rib 170. In reference to the core member 154, the exterior surface helps define the interior coolant passage 300.

The interior coolant passage 300 has an interior coolant passage discharge 302 and an interior coolant passage inlet 304. As is apparent, coolant enters the interior coolant passage 300 through the interior coolant passage inlet 304, travels through the interior coolant passage 300, and then exits via the interior coolant passage discharge 302. Upon exiting the interior coolant passage 300, coolant sprays toward the discrete cutting location in engagement with the workpiece.

Figure 14:
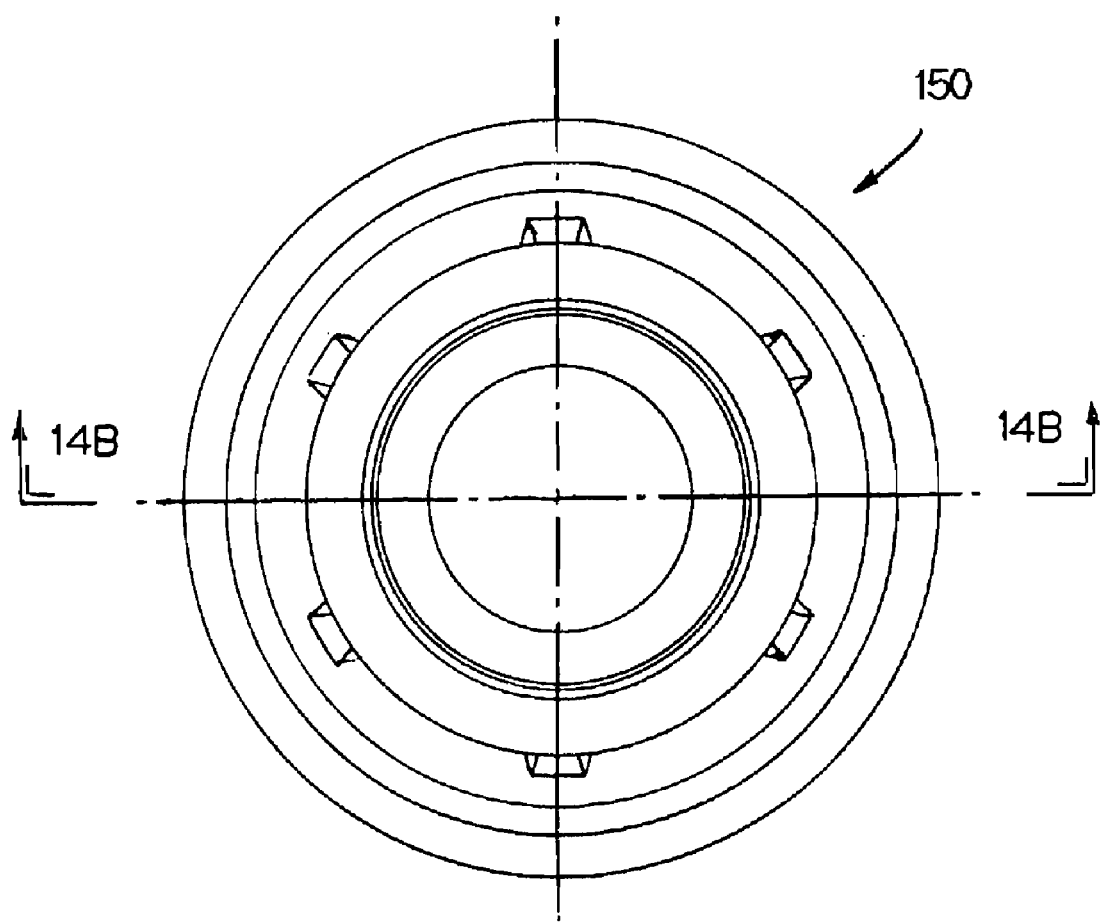
FIG. 14 is a top view of a specific embodiment of the cutting insert.
Figure 14B:
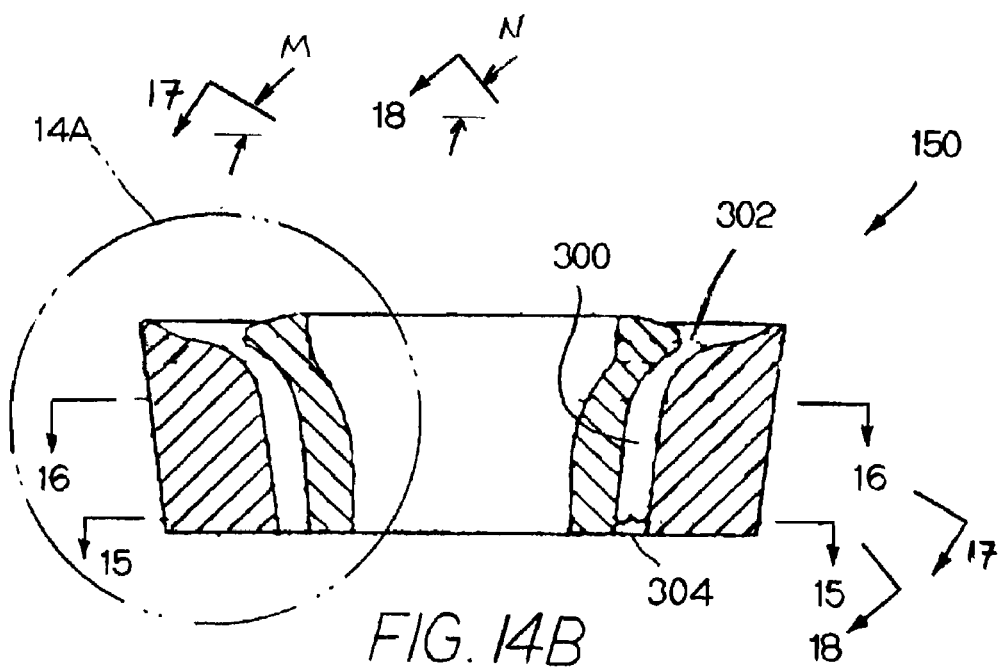
FIG. 14B is a cross-sectional view of the cutting insert of FIG. 14 taken along section line 14B-14B.
Figure 14A:
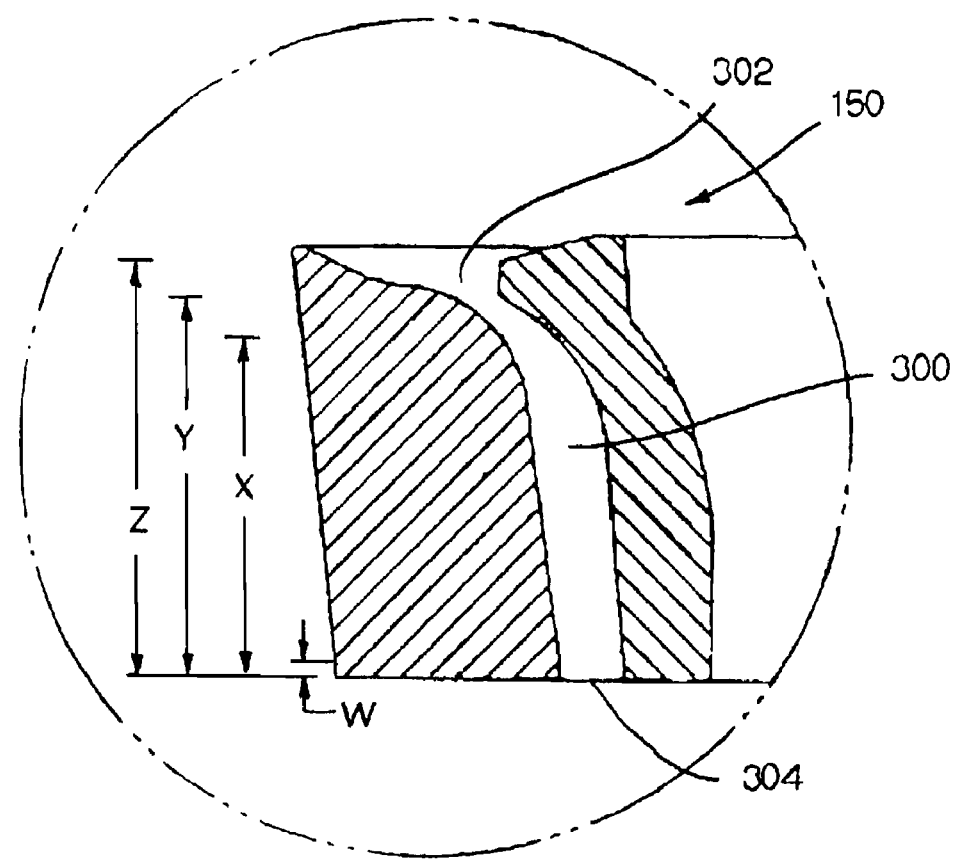
FIG. 14A is an enlarged view of a portion of the cross-sectional view FIG. 14B wherein there is shown the distinct interior coolant passageway.

FIG. 14 is a top view of the cutting insert 150 that provides a reference point for the discussion of the interior coolant passage 300, especially the geometry of the interior coolant passage 300, in a preferred specific embodiment of the cutting insert 150. FIG. 14B is a cross-sectional view of the cutting insert 150 of FIG. 14 taken along section line 14B-14B of FIG. 14. FIG. 14A is an enlarged view of the section in the circle 14A of FIG. 14B showing interior coolant passage 300. As shown in FIG. 14B, the cross-sectional views FIGS. 15, 15A, 16, 16A, 17 and 18 are taken at an orientation generally perpendicular to the general direction of the coolant flow. The cross-sectional area can be considered to be the coolant flow area at the particular location along the interior coolant passage.

Figure 20:
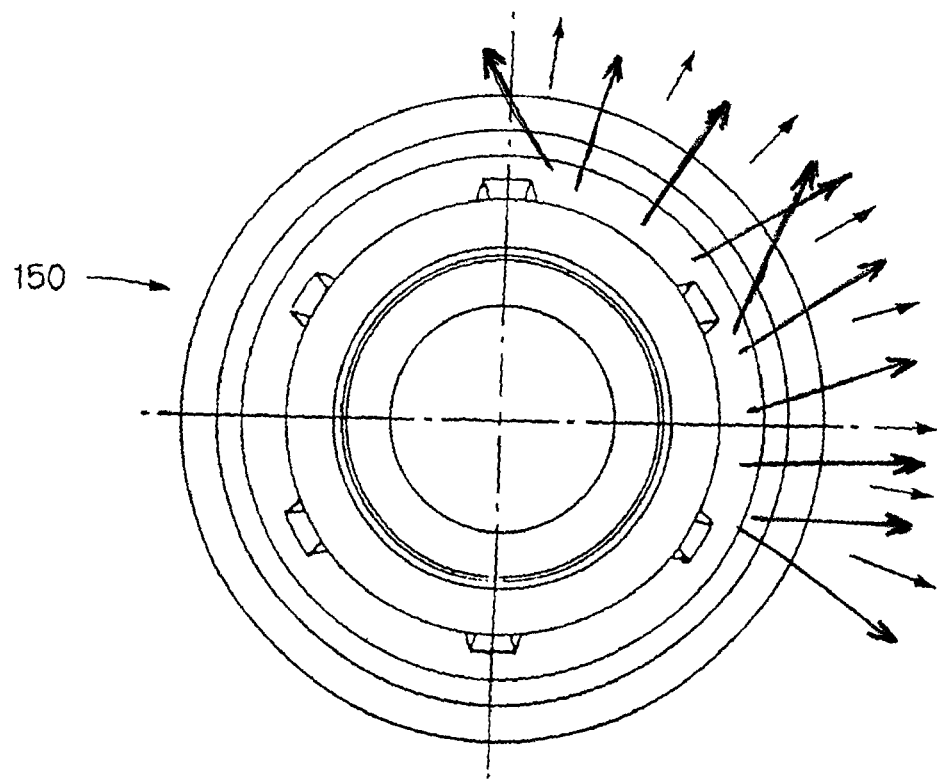
FIG. 20 is a top view of the cutting insert showing the coolant flow.

In this preferred specific embodiment, it is apparent that the geometry of the coolant flow cross-sectional area of the interior coolant passage 300 changes along the axial length of the interior coolant passage 300, i.e., the axial coolant passage length. Further, there should be an appreciation that the coolant flow cross-sectional area can vary to achieve a specific desired flow configuration or spray pattern at the insert-chip interface. In this particular embodiment, the spray pattern is of a continuous nature to present a continuous cone of coolant in the vicinity of the discrete cutting location. In this regard, FIG. 20 illustrates in schematic form the coolant spray pattern (arrows designated as "CF") when two adjacent interior coolant passages are activated, i.e., in communication with the coolant source, during a material removal operation.

Table I below sets forth the coolant flow areas at the locations shown by the cross-sections 15-15 through 18-18 in FIG. 14B for a specific embodiment of the cutting insert. The specific values in this table are merely for a preferred specific embodiment and there is no intention to be restrictive on the scope of the invention as defined by the appended claims. Table I also presents the distance each cross-section is from the interior coolant passage inlet 304. The reference letter "W", "X", "Y" and "Z" correspond to the locations of the cross-sections as indicated in Table I. More specifically, the distances "W", "X", "Y" and "Z" are at the locations where the cross-section line passes through the radial inward surface of the interior coolant passage 300.

TABLE I

Values of Coolant Flow Area in Interior Coolant Flow Passage

| Section Line Location Along Interior Coolant Flow Passage | Vertical Distance from the Interior Coolant Passage Inlet (mm) [reference letter from FIG. 14A] | Area (square millimeters) | Ratio to Inlet Coolant Flow Area |
| --- | --- | --- | --- |
| 15-15 | 0.36 [W] | 2.3797 | 1.00 |
| 16-16 | 3.98 [X] | 3.5104 | 1.48 |
| 17-17 | 5.07 [Y] | 2.9650 | 1.24 |
| 18-18 | 5.55 [Z] | 2.4473 | 1.03 |

Based on the data from Table I, the coolant passage inlet area is substantially the same as the coolant passage discharge area, the coolant flow area changes along the axial coolant passage length, and the coolant passage inlet being smaller than the coolant port area. In reference to the latter feature, in this preferred specific embodiment of the cutting insert, the coolant port to which it is in communication has a coolant port area equal to 7.06 square millimeters.

Figure 15A:
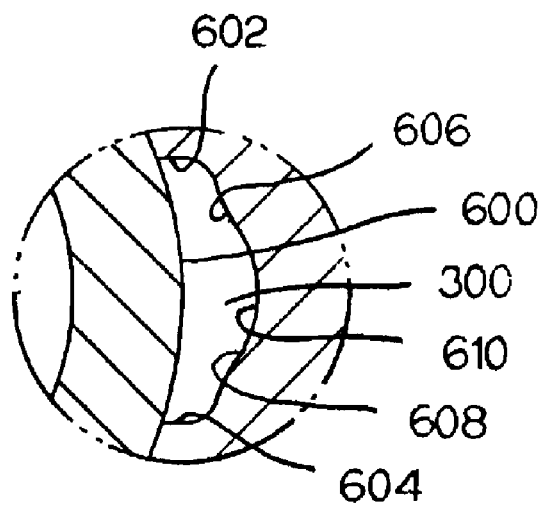
FIG. 15A is an enlarged view of a part of the cross-section of FIG. 15 in the circle designated 15A showing the geometry of the interior coolant passage.
Figure 16A:
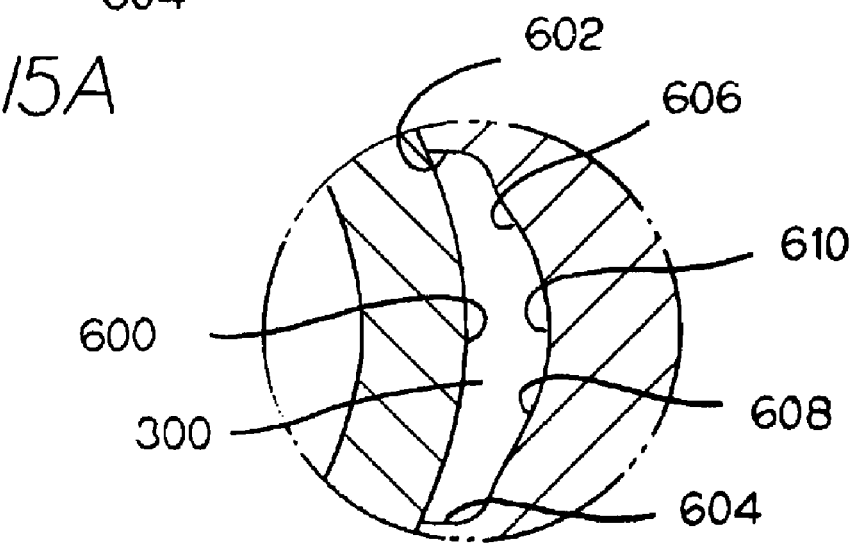
FIG. 16A is an enlarged view of a part of the cross-section of FIG. 16 in the circle designated 16A showing the geometry of the interior coolant passage.
Figure 17:
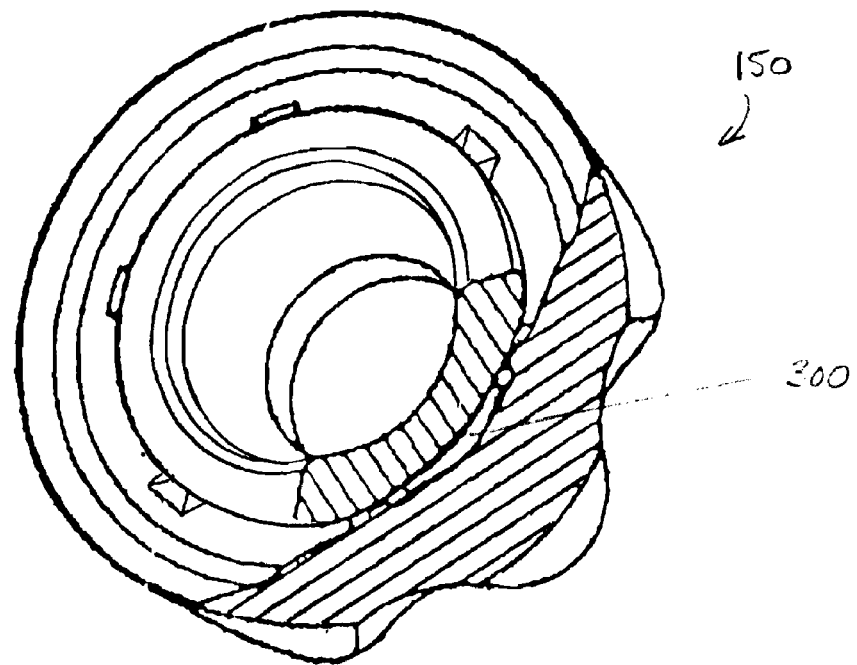
FIG. 17 is a cross-sectional view of the cutting insert showing the distinct interior coolant passageway taken along section line 17-17 of FIG. 14B wherein section line 17-17 is taken at an angle "M" equal to 30.18 degrees.

Referring to FIGS. 15A and 16A, the interior coolant passage can be defined in cross-section by an arcuate radial inward surface 600, a pair of sides 602, 604, which move in a generally radial outward direction, and a pair of converging radial outward surfaces 606, 608, which join one another at an apex 610. It is apparent from a comparison between the coolant flow areas of FIG. 15A and FIG. 16A, the coolant flow area of the interior coolant passage 300 from the interior coolant passage inlet 304 to the point at which cross-section 16-16 is taken increases. The arcuate radial inward surface 600 widens to some extent, as does the length of the pair of converging radial outward surfaces 606, 608, which join one another at an apex 610. The pair of sides 602, 604 which move in a generally radial outward direction, remain somewhat constant in this region of the interior coolant passage 300. The increase in the coolant flow area occurs due to the increase in the width of the arcuate radial inward surface 600 and the consequent increase in dimensions of the pair of converging radial outward surfaces 606, 608, which join one another at an apex 610.

Figure 18:
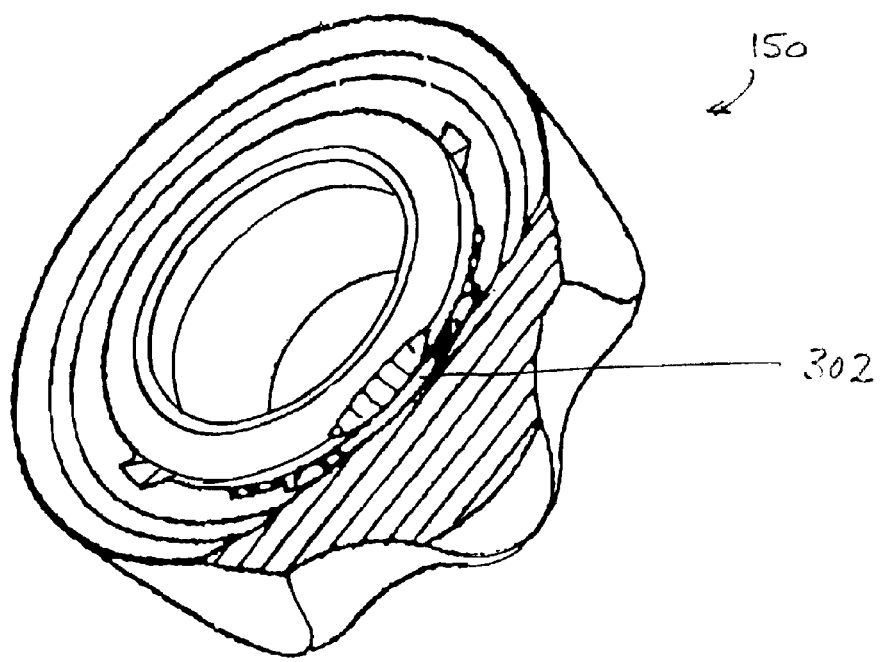
FIG. 18 is a cross-sectional view of the cutting insert showing the distinct interior coolant passageway taken along section line 18-18 of FIG. 14B wherein section line 18-18 is taken at an angle "N" equal to 50.10 degrees.

The coolant flow area increases to a lesser extent from the point of cross-section 16-16 and cross-section 17-17. A comparison between the coolant flow area at the points in the interior coolant passage 300 shown by cross-section 16-16 and 17-17 show a further widening of the interior coolant passage. The coolant flow area as shown in FIG. 18 represents the coolant flow area of the interior coolant passage discharge 302. It is apparent that overall, there is a lateral expansion and radial decrease of the interior coolant passage as it moves from the inlet to the discharge.

FIG. 15A represents the geometry of the interior coolant passage inlet 304. FIG. 18 represents the geometry of the interior coolant passage discharge 302. A comparison of these geometries shows that the geometry of the interior coolant passage inlet 304 is different from the geometry of the interior coolant passage discharge 302. This is the case even though the coolant passage inlet area is substantially the same as the coolant passage discharge area.

Figure 19A:
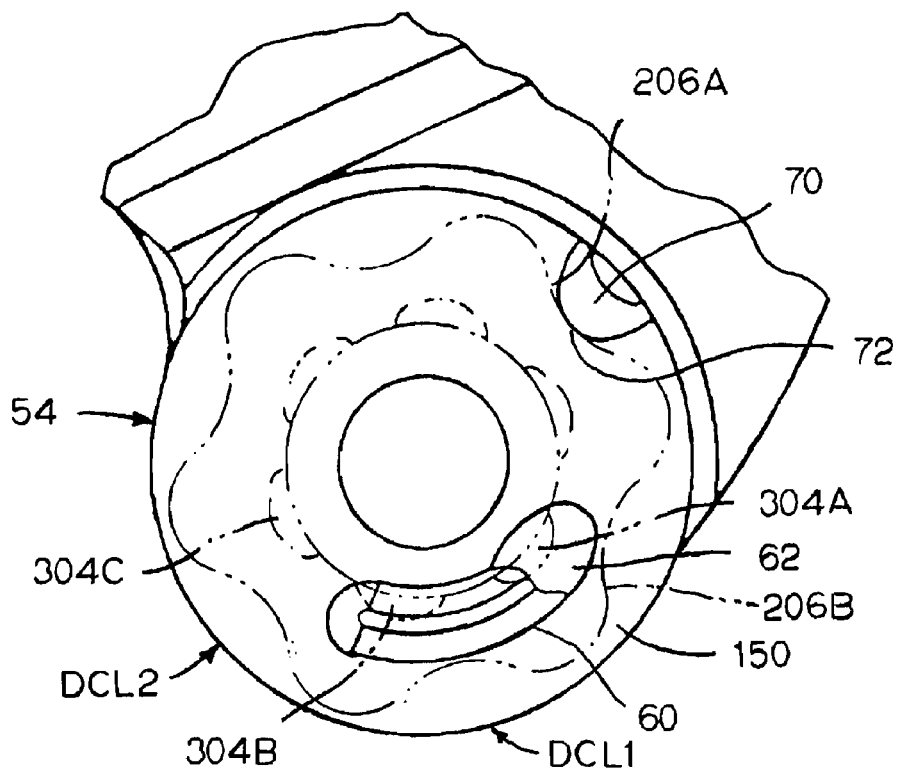
FIG. 19A is a top view illustrating the cutting insert in the pocket in one cutting position wherein the coolant inlets communicate with the coolant source and the abutment member engages the flank surface.

Referring to FIG. 19 and FIG. 19A, in operation, the cutting insert is retained in the pocket of a holder such as, for example, the milling cutter 40. In a holder like the milling cutter 40, the cutting insert 150 is maintained in the pocket by a screw that passes through the cutting insert and into the threaded aperture in the pocket. To secure the cutting insert in the pocket, the cutting insert has an orientation such that the anti-rotation abutment 70 engages the flank surface of the cutting insert. In this regard, the peripheral abutment edge 72 presents a geometry that corresponds to the geometry of the sinusoidal-shaped valley 206. This engagement creates an abutment that restricts the rotational movement of the cutting insert when in the pocket.

To engage in cutting (i.e., material removal), the cutting insert 150 is in a condition whereby there is a selected one of the plurality of discrete cutting locations engaging the workpiece. The arrow "DCL1" in FIG. 19A generally shows the selected discrete cutting location. When in this condition, the corresponding pair of the distinct interior coolant passages 300A and 300B communicate with the arcuate aperture through coolant passage inlets 304A and 304B, which is in turn, in communication with the coolant source through a coolant port.

Referring to FIG. 19A, the relative positioning between the cutting insert and the pocket shows the arcuate aperture is in fluid communication with the adjacent pair of interior coolant passage inlet 304A and 304B. There is an appreciation that coolant from the coolant source flows simultaneously into both the interior coolant passage 300A and 300B whereby interior coolant passage 300A and 300B can be considered activated. It should be understood that the pocket could include an arcuate aperture (or a like feature) that permits a trio of interior coolant passages to communicate simultaneously with the coolant source.

Figure 13:
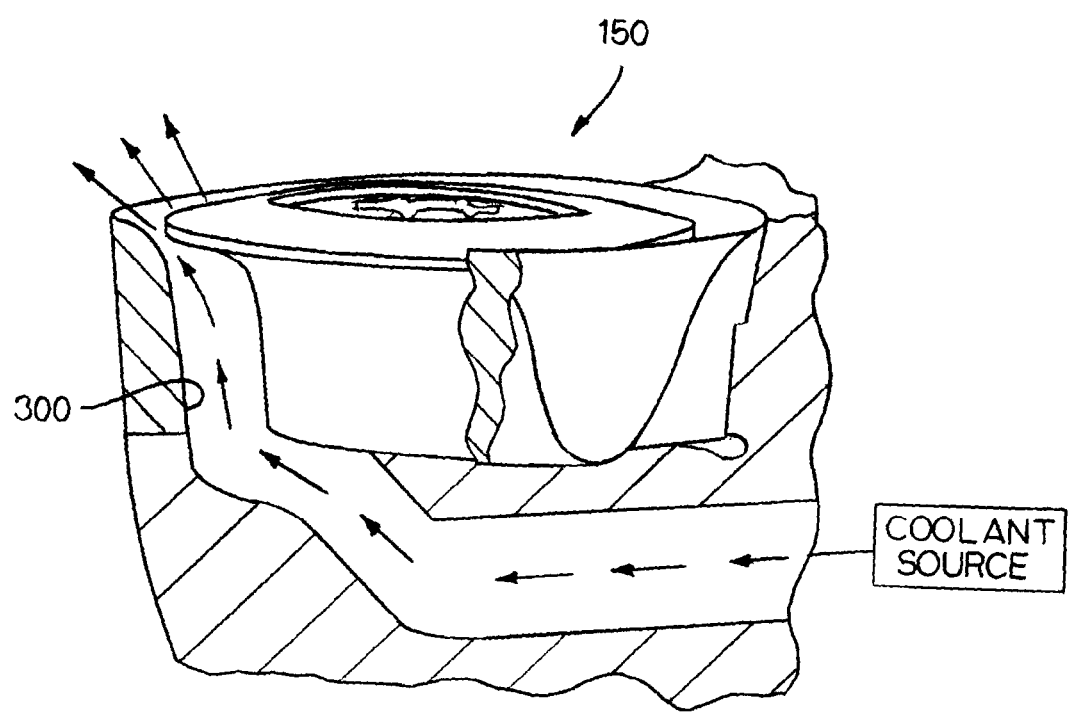
FIG. 13 is an isometric view with a part of the cutting insert and the holder removed to show the delivery of coolant to a discrete cutting location.
Figure 21:
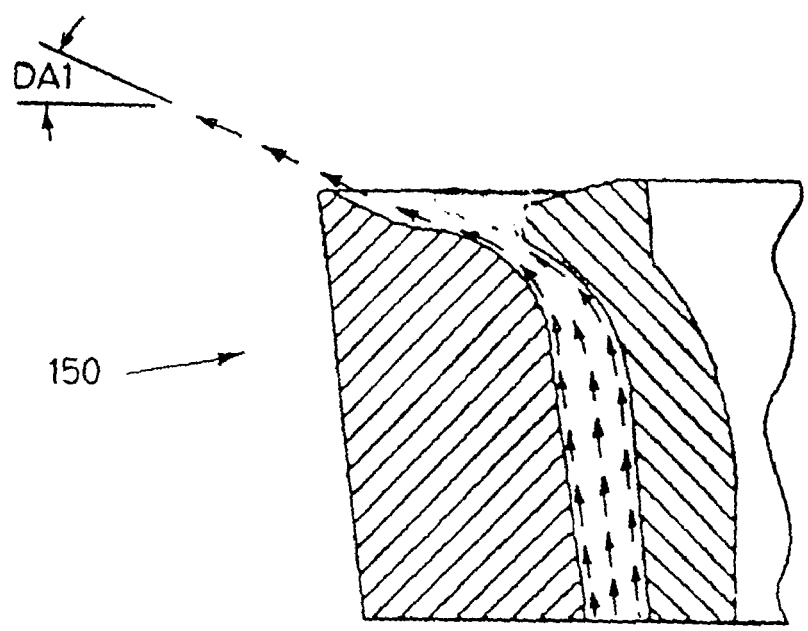
FIG. 21 is a cross-sectional view of the cutting insert showing the flow of coolant through the interior coolant passage.

Referring to FIG. 21, as one can appreciate, the coolant follows the surfaces defining the interior coolant passage 300. As the coolant follows the arcuate surface of the core, the coolant drives toward the interior coolant passage discharge 302 in a radial outward direction. The coolant thus is flowing at the cutting edge as it exits the interior coolant passage discharge 302. By flowing in a radial outward direction, the coolant better functions to flood the cutting edge in engagement with the workpiece. The coolant spray pattern shows a dispersion angle DA1, which is the angle relative to the axis parallel to the rake surface of the cutting insert. There should be an appreciation that the dispersion angle can range between about 10 degrees and about 60 degrees. A review of FIG. 13 shows the same feature that the coolant disperses as it exits the interior coolant passage discharge.

Because of the nature of the geometry of the interior coolant passage, the dispersion of coolant leads to a continuous spray of coolant. FIG. 20 is a schematic view that represents this continuous coolant spray. The continuous spray of coolant ensures that the insert-chip interface at the discrete cutting location experiences sufficient coolant flooding, and hence, sufficient coolant-caused cooling. As mentioned hereinbefore, a number of advantages exit due to the delivery of sufficient coolant to the insert-chip interface.

Figure 19B:
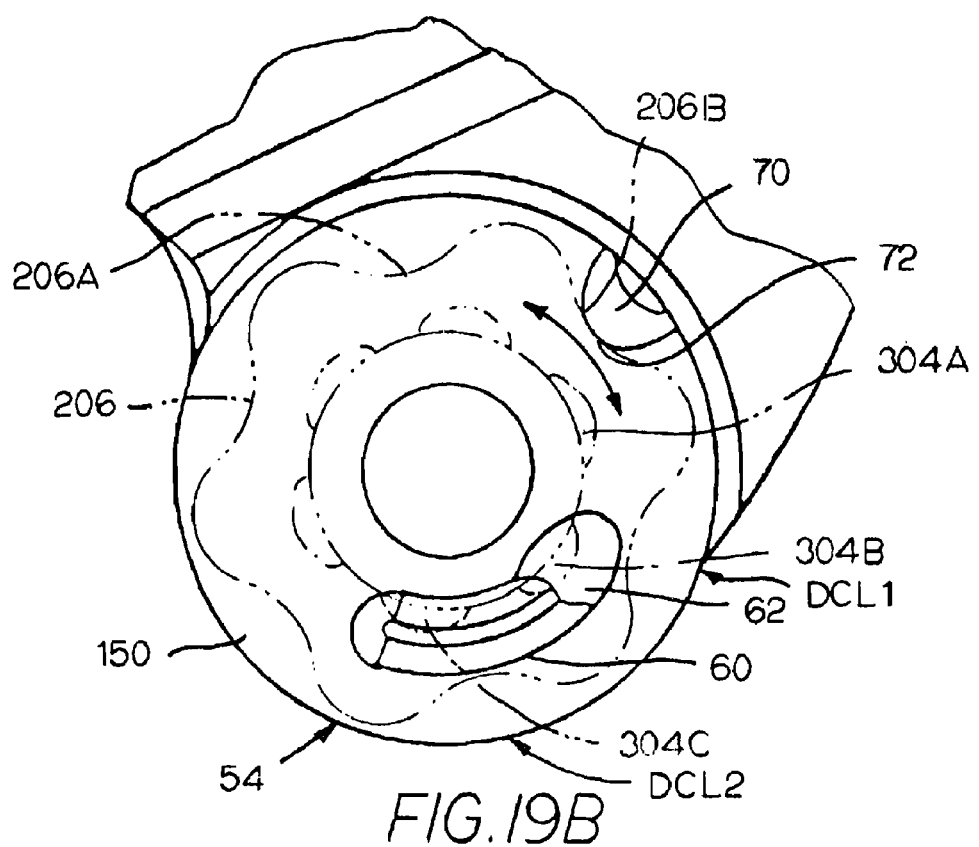
FIG. 19B is a top view illustrating the cutting insert in the pocket in an indexed cutting position wherein the coolant inlets communicate with the coolant source and the abutment member engages the flank surface.

Once the discrete cutting location has worn to a point where change is necessary, the operator can index the cutting insert to the next cutting position. FIG. 19B shows the next cutting position. The arrow "DCL2" in FIG. 19B generally shows the next selected discrete cutting location. When in the new position, the corresponding pair of the distinct interior coolant passages (300B and 300C) communicate with the coolant source via the coolant passage inlets 304B and 304C to deliver coolant to the cutting insert 150 at the selected discrete cutting location. Thus, coolant is supplied to the insert-chip interface corresponding to the new discrete cutting location.

Test results were conducted to compare a specific embodiment of the inventive (through coolant) cutting insert against a commercial cutting insert (standard cutting insert) made and sold by Kennametal Inc. of Latrobe, Pa. 15650. Both cutting inserts were made from the same grade of cemented (cobalt) tungsten carbide, the same insert style (except for the through coolant feature of the inventive cutting insert) and the same edge preparation wherein the ISO designation for the cutting inserts including the edge preparation was RCGX64SFG. The test results are set forth in Table II below in the number of passes before the cutting insert became worn to the following point wherein the failure criteria was either 0.015 inch of maximum flank wear or a maximum rake face chip of 0.030 inch, whichever occurred first.

TABLE II

Test Results (in Number of Passes) from Cutting Test

| Insert/Result | Rep. 1 | Rep. 2 | Rep. 3 | Std. Dev. | Average |
|---|---|---|---|---|---|
| Standard Cutting Insert | 6.00 | 3.00 | 4.00 | 1.53 | 4.33 |
| Inventive or Through Coolant Cutting Insert | 8.00 | 13.00 | 13.00 | 2.89 | 11.33 |

Other test parameters are set forth below. Workpiece material: Ti6Al4V. Insert edge style=round with the iC=0.750 inches; the cutter diameter was 3.00 inches; the number of inserts per cutter was one and the length of the pass was 12 inches. The cutting speed was Vc=150 feet/minute; RPM=202; the true chip load=0.006 inch/tooth; prog. chip load=0.010 inch/tooth; axial depth of cut=0.15 inches; radial depth of cut=2.000 inches; feed rate=2.020 inches per minute. The machine was a Mazak FJV; the coolant was wet; the coolant type was Syntilo® [Syntilo is a registered trademark of Castrol Limited, Wiltshire England]; the coolant pressure=1000 psi; the concentration=12.0%; and the MMR (inch$^2$/min)=0.606.

As is apparent from the test results, the inventive cutting insert experienced substantial improvement over the commercial cutting insert. The number of passes before a change was necessary increased from an average of 4.33 to an average of 11.33. This is an increase in the number of passes of about 261 percent, which is greater than 250 percent.

It is readily apparent that the present cutting insert and cutting assembly provides for the improved delivery of coolant to the interface between the milling insert and the workpiece (i.e., the insert-chip interface, which is the location on the workpiece where the chip is generated). By doing so, the present cutting insert and cutting assembly provides for enhanced delivery of coolant to the insert-chip interface so as to result in enhanced lubrication at the insert-chip interface. The consequence of enhanced lubrication at the insert-chip interface is a decrease in the tendency of the chip to stick to the cutting insert, as well as better evacuation of chips from the vicinity of the interface with a consequent reduction in the potential to re-cut a chip.

The present cutting insert and cutting assembly achieve factors that impact the extent of the coolant delivered to the insert-chip interface. For example, the size of the structure that conveys the coolant to the cutting insert can be a limiting factor on the extent of coolant supplied to the cutting insert. The present cutting insert and cutting assembly provide supply holes (coolant ports) that are equal to or larger than the inlets in the cutting insert to maximize the flow of the coolant to the cutting insert. The present cutting insert and cutting assembly provide an arrangement in which two or more coolant channels convey coolant to a single discrete cutting location. The present cutting insert and cutting assembly provide irregular coolant channels and variable areas of the inlet and the discharge in the cutting insert which allow for customization of the coolant delivery. By doing so, one can provide for a range of diversion angles of the coolant, which can range between about 10 degrees and about 60 degrees The present cutting insert and cutting assembly provides manufacturing and performance advantages. There can be advantages in using multiple pieces, which together form the cutting insert. For example, in some instances a cutting insert formed from a base, which presents the cutting edge, and a core can result in enhanced longevity because only the base need to changed after reaching the end of the useful tool life. In such an arrangement, the core is detachably joins (or functions with) to the base whereby the core is re-used when the base wears out. The base and core can join together via co-sintering, brazing and/or gluing. Furthermore, the base and core can be tightly compressed against one another still maintaining their separate and distinct character. In addition, to enhance performance, the base and the core can be from the same or dissimilar materials depending upon the specific application.

When the preferred specific embodiment of the cutting insert presents a round geometry at one or more locations, certain advantages can exist. For example, when the cutting insert has a round geometry at the location where multiple components are assembled, the assembly of multiple components, e.g., a base and a core, does not need indexing. When the cutting insert is round at the cutting edge, a round cutting insert is not handed so it can be used in left, right and neutral. In profile turning, up to 50% of the cutting insert can function as the cutting edge.

The cutting insert is also available to engage an anti-rotation feature.

The patents and other documents identified herein are hereby incorporated by reference herein. Other embodiments of the invention will be apparent to those skilled in the art from a consideration of the specification or a practice of the invention disclosed herein. It is intended that the specification and examples are illustrative only and are not intended to be limiting on the scope of the invention. The true scope and spirit of the invention is indicated by the following claims.

What is claimed is:

1. A metal cutting insert for use in chipforming and material removal from a workpiece, the metal cutting insert comprising:

a metal cutting insert body including a cutting edge having at least one discrete cutting location, the metal cutting insert body comprising a base member and a core member, and the base member having a base rake surface and a base flank surface, and each one of the discrete cutting locations comprises a discrete portion of a cutting edge formed at the intersection of the base rake surface and the base flank surface, and the core member containing an aperture for receiving a fastener;

the metal cutting insert body further containing a distinct interior coolant passage communicating with the discrete cutting location;

the distinct interior coolant passage having a coolant passage inlet defining a coolant passage inlet cross-sectional area, a coolant passage discharge defining a coolant passage discharge cross-sectional area, and an axial coolant passage length;

the distinct interior coolant passage defining a coolant flow cross-sectional area along the axial coolant passage length thereof;

the coolant passage inlet cross-sectional area being substantially the same as the coolant passage discharge cross-sectional area; and the geometry of the coolant flow cross-sectional area changing along the axial coolant passage length.

2. The metal cutting insert according to claim 1 wherein the base member being made from one of the materials selected from the group consisting of tools steels, cemented carbides, cermets, and ceramics by a powder metallurgical technique, and the core member being made from one of the materials selected from the group consisting of tools steels, cemented carbides, cermets, and ceramics by a powder metallurgical technique.

3. The metal cutting insert according to claim 2 wherein the core member being made from the same material as the core member.

4. The metal cutting insert according to claim 2 wherein the core member being made from a different material as the core member.

5. The metal cutting insert according to claim 1 wherein the base member being detachably joined to the core member.

6. The metal cutting insert according to claim 1 wherein the geometry of the coolant passage inlet cross-sectional area being different from the geometry of the coolant passage discharge cross-sectional area.

7. The metal cutting insert according to claim 1 wherein the cutting insert being received in a pocket of holder wherein the pocket having a coolant port therein, the coolant port having a coolant port cross-sectional area, and the coolant inlet cross-sectional area being less than the coolant port cross-sectional area in the pocket.

8. A metal cutting assembly for use in chipforming and material removal from a workpiece wherein a coolant source supplies coolant to the cutting assembly, the metal cutting assembly comprising:

a holder comprising a pocket, and the pocket including a flat surface containing a coolant port in communication with the coolant source wherein the coolant port has a coolant port cross-sectional area;

the pocket receiving a cutting insert;

the metalcutting insert comprising:

a cutting insert body including a cutting edge having at least one discrete cutting location the metal cutting insert body comprising a base member and a core member, and the base member having a base rake surface and a base flank surface, and each one of the discrete cutting locations comprises a discrete portion of a cutting edge formed at the intersection of the base rake surface and the base flank surface, and the core member containing an aperture for receiving a fastener;

the cutting insert body further containing a distinct interior coolant passage communicating with the discrete cutting location;

the distinct interior coolant passage having a coolant passage inlet defining a coolant passage inlet cross-sectional area, a coolant passage discharge defining a coolant passage discharge cross-sectional area, and an axial coolant passage length;

the distinct interior coolant passage defining a coolant flow cross-sectional area along the axial coolant passage length thereof;

the coolant passage inlet cross-sectional area being substantially the same as the coolant passage discharge cross-sectional area; and the geometry of the coolant flow cross-sectional area changing along the axial coolant passage length.

9. The metal cutting assembly according to claim 8 wherein the coolant passage inlet cross-sectional area being smaller than the coolant port cross-sectional area in the pocket.

10. The metal cutting assembly according to claim 8 wherein the metal cutting insert body further containing a second distinct interior coolant passage communicating with the discrete cutting location.

11. The metal cutting assembly according to claim 10 wherein the second distinct interior coolant passage having a second coolant passage inlet defining a second coolant passage inlet cross-sectional area, a second coolant passage discharge defining a second coolant passage discharge cross-sectional area, and a second axial coolant passage length; the second distinct interior coolant passage defining a second coolant flow cross-sectional area along the second axial coolant passage length thereof; the second coolant passage inlet cross-sectional area being substantially the same as the second coolant passage discharge cross-sectional area; and the geometry of the second coolant flow cross-sectional area changing along the second axial coolant passage length.

12. The metal cutting assembly according to claim 10 wherein the metal cutting insert body further containing a third distinct interior coolant passage communicating with the discrete cutting location.

13. The metal cutting assembly according to claim 12 wherein the third distinct interior coolant passage having a third coolant passage inlet defining a third coolant passage inlet cross-sectional area, a third coolant passage discharge defining a third coolant passage discharge cross-sectional area, and a third axial coolant passage length; the third distinct interior coolant passage defining a third coolant flow cross-sectional area along the third axial coolant passage length thereof; the third coolant passage inlet cross-sectional area being substantially the same as the third coolant passage discharge cross-sectional area; and the geometry of the third coolant flow cross-sectional area changing along the third axial coolant passage length.

\* \* \* \* \*

UNITED STATES PATENT AND TRADEMARK OFFICE
CERTIFICATE OF CORRECTION

PATENT NO. : 8,328,471 B2  
APPLICATION NO. : 12/797249  
DATED : December 11, 2012  
INVENTOR(S) : Joseph Nelson et al.

Page 1 of 1

It is certified that error appears in the above-identified patent and that said Letters Patent is hereby corrected as shown below:

IN THE CLAIMS  
In Column 18, Line 16, in Claim 8, delete "location" and insert --location, ¬--, therefor.

Signed and Sealed this  
Sixteenth Day of April, 2013

Teresa Stanek Rea  
*Acting Director of the United States Patent and Trademark Office*